United States Patent

Takemura et al.

(10) Patent No.: US 6,531,000 B1
(45) Date of Patent: Mar. 11, 2003

(54) SURFACE TREATED ROLLING BEARING AND MANUFACTURING METHOD THEREOF

(75) Inventors: Hiromichi Takemura, Fujisawa (JP); Yasuo Murakami, Fujisawa (JP); Youichi Matumoto, Fujisawa (JP); Seiji Sato, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/529,768

(22) PCT Filed: Apr. 16, 1999

(86) PCT No.: PCT/JP99/02030

§ 371 (c)(1),
(2), (4) Date: Apr. 19, 2000

(87) PCT Pub. No.: WO00/11235

PCT Pub. Date: Mar. 2, 2000

(30) Foreign Application Priority Data

Aug. 25, 1998 (JP) .......................... 10-239140
Sep. 2, 1998 (JP) .......................... 10-248607

(51) Int. Cl.⁷ ................................ C23C 8/10

(52) U.S. Cl. ............... 148/286; 148/287; 148/633; 384/625; 29/898.12

(58) Field of Search ............... 148/286, 287, 148/633; 384/625; 29/898.12, 898.13

(56) References Cited

U.S. PATENT DOCUMENTS

| | | | |
|---|---|---|---|
| 4,168,184 A | | 9/1979 | Hultquist |
| 5,150,974 A | * | 9/1992 | Tamada et al. .......... 384/463 |
| 5,413,643 A | * | 5/1995 | Murakami et al. .......... 148/319 |
| 5,580,398 A | | 12/1996 | Ohmi |
| 5,656,099 A | | 8/1997 | Ohmi |

FOREIGN PATENT DOCUMENTS

| | | |
|---|---|---|
| EP | 0 407 606 | 1/1991 |
| JP | 2-190615 | 7/1990 |
| JP | 5-26244 | 2/1993 |
| JP | 6-43349 | 6/1994 |
| JP | 6-89783 | 11/1994 |
| JP | 7-72565 | 8/1995 |
| JP | 9-89724 | 4/1997 |
| JP | 9-280252 | 10/1997 |
| JP | 10-122243 | 5/1998 |
| JP | 10-184701 | 7/1998 |

OTHER PUBLICATIONS

Nikkan Kogyo Shimbun Ltd, "Handbook for Metal Heat Treatment Technology", Mar. 25, 1977, p. 405, with English translation.

Japan Research Institute of Material Technology, "Surface Modification Technology", Mar. 25, 1993, p. 126, with English translation.

(List continued on next page.)

*Primary Examiner*—John Sheehan
*Assistant Examiner*—Andrew L. Oltmans
(74) *Attorney, Agent, or Firm*—Crowell & Moring LLP

(57) ABSTRACT

The present invention provides a rolling bearing in which an oxide layer of an iron/chromium oxide series is formed at a thickness of from 1 to 1000 nm to at least one of raceway surfaces of bearing rings or rolling contact surfaces of rolling elements and a manufacturing method thereof. The oxide layer can inhibit hydrogen formed by decomposition of water incorporated in the lubricants from intruding into the matrix of the bearing members, thereby preventing early peeling for the raceway surfaces of the bearing rings or the rolling contact surfaces of the rolling elements and, thus, greatly improving the rolling life. The oxide layer can be formed simply by merely tempering the bearing member and then applying a re-heating treatment in air at a temperature lower than the tempering temperature.

2 Claims, 16 Drawing Sheets

OTHER PUBLICATIONS

Japan Society for the Promotion of Science, "Steel and Alloy Elements", Feb. 28, 1966, p. 332, with English translation.

"The Surface–initiated and Subsurface–initiated Rolling Contact Fatigue", NSK Bearing Journal No. 636, pp. 1–10, 1977, Furumura, Shirota, Hirakawa (No month data available).

"Effects of Water and Oxygen During Rolling Contact Lubrication", Wear 12, pp. 331–342, 1968, P. Schatzberg, I.M. Felsen (No month data).

SAE Technical Paper: SAE 950944 (held on Feb. 27–Mar. 2, in 1995).

Pretext for Japan Tribology Conference (Tokyo, (May 1995)), pp. 551–554.

* cited by examiner

FIG. 8

| | | Oxide layer thickness (nm) | Bearing hardness | Heating method for re-heating oxidation |
|---|---|---|---|---|
| Example | 1 | 1 | 63 | 100°C × 120 min |
| | 2 | 5 | 63 | 100°C × 120 min (three times) |
| | 3 | 3 | 63 | 150°C × 60 min |
| | 4 | 21 | 63 | 150°C × 60 min (twice) |
| | 5 | 43 | 63 | 200°C × 30 min |
| | 6 | 100 | 62.5 | 250°C × 20 min |
| | 7 | 93 | 62.5 | 300°C × 15 min |
| | 8 | 87 | 62.5 | 350°C × 10 min |
| | 9 | 225 | 58 | 400°C × 5 min |
| | 10 | 358 | 58 | 400°C × 10 min |
| | 11 | 491 | 57 | 450°C × 5 min |
| | 12 | 1000 | 57 | 450°C × 10 min |
| | 13 | 1 | 57 | 100°C × 120 min |
| | 14 | 10 | 59 | 250°C × 20 min |
| | 15 | 1000 | 60 | 400°C × 10 min |
| Comp. Example | 1 | 0 | | None |
| | 2 | 0.2 | | 100°C × 10 min |
| | 3 | 3000 | | 500°C × 5 min |
| | 4 | 1000 | | Black coating |

FIG. 9

| | | Evaluation time (hr) | Presence of absence of peeling (fracture) |
|---|---|---|---|
| Example | 1 | 79 | Outer ring peeling in 4/10 |
| | 2 | 100 | with no peeling |
| | 3 | 82 | Outer ring peeling in 3/10 |
| | 4 | 100 | with no peeling |
| | 5 | 100 | with no peeling |
| | 6 | 100 | with no peeling |
| | 7 | 100 | with no peeling |
| | 8 | 100 | with no peeling |
| | 9 | 91 | Outer ring peeling in 1/10 |
| | 10 | 89 | Outer ring peeling in 1/10 |
| | 11 | 85 | Outer ring peeling in 2/10 |
| | 12 | 84 | Outer ring peeling in 4/10 |
| | 13 | 86 | Outer ring peeling in 3/10 |
| | 14 | 100 | with no peeling |
| | 15 | 100 | with no peeling |
| Comp. Example | 1 | 12 | Outer ring peeling in 10/10 |
| | 2 | 35 | Outer ring peeling in 10/10 |
| | 3 | 45 | Peeled from pit initiation point in 10/10 |
| | 4 | 42 | Vibration increased and stopped in 5/10 |

FIG. 10

|  |  | Evaluation time (hr) | Presence of absence of peeling (fracture) |
|---|---|---|---|
| Example | 1 | 100 | with no peeling |
|  | 2 | 100 | with no peeling |
|  | 6 | 100 | with no peeling |
|  | 12 | 83 | Outer ring peeling in 3/10 |
| Comp. Example | 1 | 31 | Outer ring peeling in 10/10 |
|  | 2 | 47 | Outer ring peeling in 10/10 |
|  | 3 | 46 | Peeled from pit initiation point in 10/10 |

FIG. 11

|  |  | Oxide layer thickness (nm) | Amoount of residual austenite (vol%) | Bearing hardness (HRC) | Evaluation time (hr) | Presence or absence of scorching/peeling |
|---|---|---|---|---|---|---|
| Example | 1 | 1 | 15 | 63 | 131 | Creep in 4/10 |
|  | 2 | 5 | 13 | 63 | 125 | Creep in 4/10 |
|  | 6 | 100 | 9 | 62.5 | 141 | Creep in 3/10 |
|  | 12 | 1000 | 7 | 57 | 200 | Creep in 2/10 |
|  | 13 | 1 | 0 | 57 | 350 | None |
|  | 14 | 100 | 6 | 59 | 280 | Creep in 1/10 |
|  | 15 | 1000 | 3 | 60 | 315 | Creep in 1/10 |
| Comp. Example | 1 | 0 | 13 | 62 | 83 | Stopped in 10/10 |
|  | 2 | 0.2 | 6 | 62 | 85 | Scorched in 5/10 |
|  | 3 | 3000 | 4 | 58 | 105 | Scorched in 3/10 |

FIG. 12

|  |  | Evaluation time (hr) | Presence of absence of peeling (fracture) | Oxide layer thickness (nm) | Heating method for re-heating oxidation |
|---|---|---|---|---|---|
| Example | 1 | 985 | Peeling in 4/10 | 1 | 100°C × 120 min |
|  | 2 | 1500 | With no peeling | 5 | 100°C × 120 min (three times) |
|  | 3 | 1057 | Peeling in 4/10 | 3 | 100°C × 60 min |
|  | 4 | 1500 | With no peeling | 20 | 100°C × 60 min (twice) |
|  | 5 | 1500 | With no peeling | 45 | 200°C × 30 min |
|  | 6 | 1500 | With no peeling | 100 | 250°C × 20 min |
|  | 7 | 1500 | With no peeling | 90 | 300°C × 15 min |
|  | 8 | 1500 | With no peeling | 85 | 350°C × 10 min |
|  | 9 | 1424 | Peeling in 2/10 | 225 | 400°C × 5 min |
|  | 10 | 1378 | Peeling in 2/10 | 310 | 400°C × 10 min |
|  | 11 | 1125 | Peeling in 2/10 | 485 | 450°C × 5 min |
|  | 12 | 816 | Peeling in 4/10 | 1000 | 450°C × 10 min |
| Comp. Example | 1 | 124 | Peeling in 10/10 | 0 | None |
|  | 2 | 215 | Peeling in 10/10 | 0.2 | 100°C × 20 min |
|  | 3 | 239 | Peeling from pit initiation point in 10/10 | 3000 | 500°C × 5 min |

| | | C | Si | Mn | Cr | Tempering Temperature | Remarks |
|---|---|---|---|---|---|---|---|
| Example | 51 | 1.10 | 0.25 | 0.38 | 1.4 | 240°C | SUJ2 |
| | 52 | 0.98 | 0.18 | 0.45 | 1.5 | 280°C | SUJ2 |
| | 53 | 1.14 | 0.34 | 0.24 | 1.3 | 320°C | SUJ2 |
| | 54 | 0.75 | 0.49 | 0.57 | 0.6 | 240°C | |
| | 55 | 0.80 | 0.28 | 1.10 | 0.5 | 240°C | |
| | 56 | 0.84 | 0.50 | 0.81 | 0.4 | 280°C | |
| | 57 | 0.70 | 0.33 | 0.78 | 0.3 | 280°C | |
| | 58 | 0.93 | 0.47 | 0.50 | 0.5 | 320°C | |
| | 59 | 0.85 | 0.15 | 0.84 | 0.6 | 320°C | |
| Comp. Example | 51 | 1.15 | 0.31 | 0.40 | 1.5 | 160°C | SUJ2 |
| | 52 | 0.99 | 0.21 | 0.37 | 1.5 | 200°C | SUJ2 |
| | 53 | 1.07 | 0.15 | 0.25 | 1.4 | 240°C | SUJ2 |
| | 54 | 0.79 | 0.40 | 0.90 | 0.6 | 160°C | |
| | 55 | 0.60 | 0.37 | 0.10 | 3.0 | 160°C | |
| | 56 | 1.38 | 0.10 | 0.55 | 0.5 | 200°C | |
| | 57 | 0.70 | 0.28 | 0.78 | 0.6 | 200°C | |
| | 58 | 0.63 | 0.41 | 0.80 | 0.2 | 360°C | |
| | 59 | 0.85 | 0.34 | 0.63 | 0.5 | 360°C | |

FIG. 14

| | | Hardness (HRC) | γR (%) | Evaluation time (hr) | Presence or absence of peeling | Oxide layer thickness (nm) | Hearting method for oxide layer formation |
|---|---|---|---|---|---|---|---|
| Example | 51 | 61 | 2.0 | 1850 | Peeling in 4/10 | 5 | 200°C × 300 min |
| | 52 | 60 | 1.3 | 1912 | Peeling in 3/10 | 15 | 200°C × 20 min (twice) |
| | 53 | 58 | 0.0 | 1790 | Peeling in 1/10 | 100 | 290°C × 20 min |
| | 54 | 65 | 1.5 | 2000 | With no Peeling | 20 | 180°C × 60 min (three times) |
| | 55 | 61 | 0.8 | 2000 | With no Peeling | 31 | 210°C × 30 min |
| | 56 | 59 | 0.0 | 2000 | With no Peeling | 53 | 250°C × 40 min |
| | 57 | 60 | 1.0 | 2000 | With no Peeling | 67 | 230°C × 60 min |
| | 58 | 59 | 0.0 | 2000 | With no Peeling | 25 | 220°C × 40 min |
| | 59 | 63 | 0.0 | 2000 | With no Peeling | 80 | 290°C × 20 min |
| Comp. Example | 51 | 63 | 9.5 | 51 | Scorching in 10/10 | 0 | None |
| | 52 | 62 | 7.3 | 187 | Peeling in 10/10 | 1 | 170°C × 30 min |
| | 53 | 57 | 0.0 | 241 | Vibration increased in 10/10 | 250 | 300°C × 30 min |
| | 54 | 60 | 5.0 | 665 | Vibration increased in 10/10 | 30 | 250°C × 40 min |
| | 55 | 56 | 6.9 | 48 | Peeling in 4/10, Scorching in 6/10 | 8 | 160°C × 120 min |
| | 56 | 61 | 4.7 | 853 | Vibration increased in 10/10 | 57 | 270°C × 30 min |
| | 57 | 62 | 5.1 | 137 | Scorching in 10/10 | 13 | 170°C × 120 min |
| | 58 | 56 | 0.0 | 750 | Peeling in 10/10 | 80 | 250°C × 40 min |
| | 59 | 61 | 0.0 | 574 | Pit initiation point in 10/10 | 1500 | 360°C × 10 min |

FIG. 15

Chemical ingredient (%)

| | | C | Si | Cr | Mo | Surface C | Surface N | Primary Tempering Temperature | Remarks |
|---|---|---|---|---|---|---|---|---|---|
| Example | 1 | 0.2 | <u>0.4</u> | 1.5 | 0.5 | 0.85 | 0.10 | 400°C | Low Si |
| | 2 | 0.3 | 0.8 | <u>0.1</u> | 2.0 | 1.20 | — | 400°C | Low Cr |
| | 3 | 0.4 | 0.7 | 0.8 | <u>0.1</u> | 0.95 | — | 400°C | Low Mo |
| | 4 | 0.5 | 0.9 | 0.8 | 2.0 | 1.00 | — | 400°C | |
| | 5 | 0.4 | 1.1 | 1.2 | 1.1 | 1.15 | 0.25 | 400°C | |
| | 6 | 0.6 | 1.2 | 0.5 | 1.0 | 1.05 | 0.30 | 450°C | |
| | 7 | 0.2 | 0.9 | 1.8 | 1.5 | 0.95 | 0.40 | 450°C | |
| | 8 | 0.4 | 1.0 | 2.0 | 1.8 | 0.80 | 0.50 | 500°C | |
| | 9 | 0.2 | 1.3 | 1.4 | 1.2 | 1.20 | 0.10 | 500°C | |
| Comp. Example | 1 | <u>1.0</u> | <u>0.3</u> | 1.5 | — | — | — | 400°C | Direct hardening |
| | 2 | 0.4 | 0.7 | 0.8 | 0.5 | 0.90 | — | <u>160°C</u> | γR = 30% |
| | 3 | 0.3 | 1.0 | 0.9 | 1.0 | 0.85 | 0.1 | 400°C | No secondary heating |
| | 4 | 0.3 | 0.7 | 0.8 | 1.2 | 1.10 | 0.2 | 400°C | Remarkable secondary heating |
| | 5 | <u>0.1</u> | 1.1 | 1.0 | 0.5 | 0.70 | — | 400°C | Low C |
| | 6 | 0.3 | 0.8 | 1.4 | 0.5 | 0.85 | 0.05 | <u>600°C</u> | |

FIG. 16

| | | Layer thickness (nm) | Surface hardness (Hv) | Secondary heating method |
|---|---|---|---|---|
| Example | 1 | 300 | 650 | 360°C × 20 min |
| | 2 | 1 | 695 | 150°C × 100 min |
| | 3 | 1000 | 670 | 390°C × 10 min |
| | 4 | 5 | 850 | 200°C × 40 min |
| | 5 | 19 | 800 | 250°C × 30 min |
| | 6 | 24 | 750 | 250°C × 30 min |
| | 7 | 50 | 780 | 300°C × 20 min |
| | 8 | 100 | 730 | 350°C × 10 min |
| | 9 | 83 | 700 | 350°C × 10 min |
| Comp. Example | 1 | 20 | <u>520</u> | 250°C × 30 min |
| | 2 | 17 | 700 | 300°C × 20 min |
| | 3 | — | 750 | None |
| | 4 | <u>2000</u> | 660 | 450°C × 5 min |
| | 5 | 22 | <u>630</u> | 300°C × 20 min |
| | 6 | 100 | <u>605</u> | 350°C × 10 min |

FIG. 17

|  |  | Evaluation time (hr) | Presence of absence of peeling (fracture) |
|---|---|---|---|
| Example | 1 | 83 | Outer ring peeling in 6/10 |
|  | 2 | 80 | Outer ring peeling in 7/10 |
|  | 3 | 91 | Outer ring peeling in 4/10 |
|  | 4 | 100 | with no peeling |
|  | 5 | 100 | with no peeling |
|  | 6 | 100 | with no peeling |
|  | 7 | 100 | with no peeling |
|  | 8 | 100 | with no peeling |
|  | 9 | 100 | with no peeling |
| Comp. Example | 1 | 8 | Inner and outer ring peeling in 10/10 |
|  | 2 | 21 | Scorching in 10/10 |
|  | 3 | 12 | Outer ring peeling in 10/10 |
|  | 4 | 30 | Peeling from pit initiation point in 10/10 |
|  | 5 | 42 | Inner and outer ring peeling in 10/10 |
|  | 6 | 39 | Inner and outer ring peeling in 10/10 |

FIG. 18

|  |  | Evaluation time (hr) | Presence or absence of peeling (fracture) |
|---|---|---|---|
| Example | 1 | 90 | Outer ring peeling in 3/10 |
|  | 2 | 100 | with no peeling |
|  | 3 | 98 | Outer ring peeling in 3/10 |
| Comp. Example | 2 | 10 | Scorching in 10/10 |
|  | 3 | 15 | Outer ring peeling in 10/10 |
|  | 4 | 47 | Peeling from pit initiation point in 10/10 |

SURFACE TREATED ROLLING BEARING AND MANUFACTURING METHOD THEREOF

TECHNICAL FIELD

The present invention relates to a rolling bearing used under a high temperature circumstance and, in particular, it relates to a surface-treated rolling bearing in a working circumstance where water tends to intrude in lubricants, for example, a bearing for use in transmissions, hub units and engine auxiliaries of automobiles, a bearing for use in guide rolls or backup rolls in iron manufacturing machines and a bearing for use in dryer rolls in paper making machines.

BACKGROUND ART

For instance, in bearings for use in automobile wheel, water tends to intrude into lubricants in the inside of the bearings under the effect of muddy water on road or rain water. Further, also in a case of bearings for use in guide rolls in continuous casting facilities or for use in backup rolls in rolling mills for iron and steel materials, cooling water or water for rolling tends to intrude in lubricants. Further, in bearings for use in dryer rolls for paper making machines, it is said that steams tend to intrude to the inside of the bearings since they are used in the process of drying moistened paper.

In the rolling bearings, it has been generally known that durability of lubricants is greatly deteriorated when water intrudes into them. For example, it has been reported that the rolling life of a bearing is deteriorated about from one/severals to one/twenties when 6% water content intrudes into the lubricant compared with that before intrusion of water ("The Surface-initiated and Subsurface-initiated Rolling Contact Fatigue", NSK Bearing Journal No. 636, pp. 1–10, 1977, Furumura, Shirota, Hirakawa).

Further, it has been reported that when water intrudes into the inside of a bearing, for example, even when a slight amount of water content intrudes such as by about 100 ppm into the lubricants, the rolling fatigue strength of the bearing material is lowered as much as by 32 to 48% ("Effects of Water and Oxygen During Rolling Contact Lubrication", Wear 12, pp 33–342, 1968, P. Schatzberg, I. M. Felsen).

Further as an example of J. A. Cirula, it has been reported for a test of intruding water in lubricants in a 4-ball rolling test that the bearing life was deteriorated to about 1/10 compared with that before intrusion. In a rolling contact fatigue test for a bearing using steel balls charged with hydrogen, it has been shown that stainless steel balls have longer life than SUJ2 steel balls of second class bearing steel, but use of more expensive stainless steel balls than SUJ2 as a countermeasure for improving the bearings is practically difficult.

Then, in view of undesired effects of the water content on the bearing life, bearings have been sealed, for example, with contact rubber seals in order to prevent intrusion of water to the inside of rolling bearings used under a condition where water tends to intrude.

On the other hand, in bearings used under high rotational speed and high load such as bearings for use in automobile alternators, it has been reported a phenomenon that hydrogen is formed by decomposition of lubricants and the thus formed hydrogen atoms intrude into steels to cause peeling in an early stage as the phenomenon accompanied by the progress of remarkable increase in the speed of the equipments in recent years. For the early stage peeling phenomenon, it has been considered that water contained in lubricants (for example, water is contained always by about 0.1% in grease, or traction oils or ATF also contains water) is decomposed under high vibrations and high load, and hydrogen ions formed are adsorbed on the raceway surface and accumulated as hydrogen atoms to highly strained sites (in the vicinity of maximum shearing stress position) to cause stress corrosion cracking type peeling.

As the prior art intending for improving the working life of bearings used under high vibrations and high load accompanying such early peeling phenomenon, Japanese Patent Examined Publication No. 6-89783, for instance, discloses applying a heat treatment to bearing rings of grease-lubricated bearings in atmospheric air at a temperature of 200° C. or lower, to form an oxide layer (black coating) of 0.1 to 2.5 μm thickness on the rolling surfaces of the bearing rings to suppress intrusion of hydrogen to the bearing raceway surfaces caused by the decomposition of the lubricants.

Further, Japanese Utility Model Unexamined Publication No. 6-43349 also discloses a bearing in which an oxide layer of 0.1 to 2.5 μm thickness is formed to the rolling surface of the roll bearing lubricated with lubricants. Further, Japanese Patent Unexamined Publication No. 5-26244 discloses a bearing in which at least a fixed bearing ring is formed of 1.5 to 6.0% Cr steel in a grease-sealed bearing, so that brittle peeling can be prevented by passivated layers of the material per se of the bearing ring.

Further, "SAE Technical Paper: SAE 950944 (held on Feb. 27–Mar. 2, in 1995") discloses, in 1st to 14th paragraphs, a technique of preventing early peeling by analyzing fatigue mechanism of bearings for use in alternaters, replacing the sealed grease from E grease to M grease having a high damper effect, absorbing high vibrations and high load by the M grease while maintaining sufficient lubricant layers. For the early peeling phenomenon in bearings for use in engine auxiliaries, it is considered that if, for example, a grease with low damper effect is sealed in a bearing in a case where high vibrations/high loads exert by way of a belt from an engine crank to the bearing, lubricant layers are destroyed between rolling elements and raceway surfaces, hydrogen ions formed upon decomposition of water contained in the lubricants intrude through the fractured portions of the oil membranes and are absorbed to the raceway surfaces, to result in stress corrosion cracking type peeling.

A source of generating water in the bearings for use in engine auxiliaries is not restricted only to the water content in the grease. Since the bearings for use in the engine auxiliaries are often used in a high temperature state and they are cooled to an atmospheric temperature after stopping of the operation, it may be considered that water is formed by condensation from air present in slight spaces inside of the bearings or by intrusion of muddy water or the like from the outside.

In the sealing technique by using seals or the like as described above, it may be considered that the water content in the lubricants can be suppressed to about 10% or lower by the combined use of contact rubber seals attached to a chuck at the outside of the bearings and contact rubber seals incorporated in the bearing. However, there is a problem that intrusion of water into the lubricants can not be prevented completely. Even if intrusion of water from the outside can be prevented completely, it can not prevent water caused by condensation from air, for example, in the bearings for use in the engine auxiliaries which are stopped and cooled after operation at a high temperature.

On the other hand, the bearings disclosed in Japanese Patent Examined Publication No. 6-89783 and Japanese Utility Model Unexamined Publication No. 6-43349 intend to prevent intrusion of water into the inside of the bearings not by the rubber seal or the like but by directly suppressing and preventing intrusion of hydrogen caused by the decomposition of the lubricants to the raceway surfaces of bearings. However, also this technique involves a problems in view of facilities or treating time since it is necessary to apply a laborious treatment of dipping a bearing ring in an aqueous solution of sodium hydroxide heated to a low temperature to form tri-iron tetroxide layer (generally referred to as black coating) and further it includes a treatment of etching the rolling surface in an oxidative aqueous solution such as nitric acid, hydrochloric acid or sulfuric acid as other solvent to such an extent as causing coloration. Further, since the thickness of the oxide layer is as large as 2.5 µm at the maximum, the bearing roughness is worsened when a large bearing load exerts, to possibly result in a problem of increase of vibrations.

On the other hand, it may be considered to heat the bearing material at high temperature in air as a means for forming the oxide layer to the bearing but, when the bearing is merely heated in air with no temperature control, oxidation occurs to form scales (black skins) of about several µm thickness on the surface of the material. Unevenness of the scales may lead to loss of metals and possibly form initiation points for pit or the like. Further, if the bearing is merely left in atmospheric air, it may be considered that moisture in air and steels may possibly take place reaction to cause atmospheric corrosion.

Further, for the bearing disclosed in Japanese Patent Unexamined Publication No. 5-26244, it is described that a chromium oxide layer is formed on the surface of the bearing ring to inactivate the rolling surface by the use of 1.5–6% Cr steels at least to the fixed ring to prevent intrusion of hydrogen caused by decomposition of grease. However, as shown in "Pretext for Japan Tribology Conference (Tokyo, 1995-5) pp 551–554", since auto-slipping is caused at the inlet of the fixed rings in bearings for use in engine auxiliaries used under high vibrations/high load, the oxide layer intended for providing the damper effect is cut and, as a result, the outer ring in which early peeling occurs frequently undergoes load directly and it is actually difficult to prevent early peeling in the fixed ring.

The present invention has been accomplished for overcoming such disadvantages in the prior art and it is an object thereof to provide a surface-treated rolling bearing by forming an iron/chromium oxide series oxide layer of about 1 to 1000 nm thickness on the surface of bearing members used in a circumstance in which water is incorporated in lubricants, thereby enabling to suppress formation of hydrogen caused by decomposition of incorporated water and intrusion of hydrogen atoms into the matrix of the members and remarkably improve the bearing life, as well as a manufacturing method thereof.

DISCLOSURE OF THE INVENTION

For attaining such an object, the invention described in claims 1 to 7 of the present invention relates to a surface-treated rolling bearing.

The surface-treated rolling bearing according to the present invention is a rolling bearing in which a plurality of rolling elements are arranged between bearing rings comprising a fixed ring and a rotational ring in use, wherein an oxide layer of 1 to 1000 nm thickness comprising an iron/chromium oxide series (hereinafter also referred to as a re-heating oxide layer) is provided at least to one of the raceway surfaces of the bearing rings or the rolling surfaces of rolling elements. This prevents intrusion of water incorporated in lubricants and formation of hydrogen caused by decomposition of incorporated water and intrusion of hydrogen atoms into the matrix of bearing members thereby preventing early peeling at the raceway surfaces of the bearing rings or the raceway surfaces of the rolling elements to greatly improve the rolling contact life.

In this case, if the thickness of the oxide layer is less than 1 nm, it is difficult to inhibit intrusion of the hydrogen atoms into the matrix of the bearing members and early peeling on the raceway surfaces of the bearing rings or the rolling surfaces of the rolling elements can not be prevented completely. A preferred thickness of the oxide layer is from 5 to 1000 nm. This can prevent intrusion of the hydrogen atoms into the matrix of the bearing members more reliably.

Further, the surface hardness of the raceway surface of the bearing ring or the rolling contact surface of the rolling elements formed with the oxide layer is Hv 650 or more.

Further, when the amount of residual austenite in at least one of the bearing ring or the rolling element is 6.0 vol % or less, dimensional expansion caused by decomposition of the residual austenite at high temperature is suppressed to improve the bearing function in view of creep prevention. A more preferred result is obtainable when the amount of residual austenite is 2.0 vol % or less.

The ingredient composition of the alloy steel for the bearing member in the present invention varies depending on whether carburization or carbo-nitridation is applied or not to the bearing members. In a case of so-called direct hardening not applying carburization or carbo-nitridation, the ingredient composition of the alloy steel for at least one of the bearing ring or the rolling element to be formed with the oxide layer comprises C: 0.7–0.93% by weight, Si: 0.15–0.50% by weight, Mn: 0.50–1.10% by weight and Cr: 0.30–0.65% by weight.

On the other hand, when carburization or carbo-nitridation is applied, the ingredient composition of the alloy steel for at least one of the bearing ring or the rolling element to be formed with the oxide layer comprises C: 0.2–0.6% by weight, Si: 0.7–1.5% by weight, Cr: 0.5–2.0% by weight and Mo: 0.5–2.0% by weight, to which carburization or carbo-nitridation is applied. After applying carburization or carbo-nitridation and further applying grinding treatment, it is desirable that the surface C concentration is 0.8–1.2% by weight or the surface N concentration is 0.05–0.5% by weight.

The invention described relates to a method of manufacturing a surface-treated rolling bearing.

A first method of manufacturing a surface-treated rolling bearing according to the present invention comprises a step of applying a hardening treatment to at least one member of bearing rings or rolling elements and then applying a tempering treatment within a temperature range from 240 to 320° C., and a step of applying re-heating to the tempered member in air at a temperature lower by 30° C. or more than the tempering temperature thereby forming an oxide layer of 1 to 1000 nm thickness comprising iron/chromium oxide series to the surface of the member to increase the surface hardness to Hv 650 or higher.

Further a second manufacturing method comprises a step of applying a hardening treatment to at least one member of bearing rings or rolling elements and then applying a tempering treatment within a temperature range from 400 to 500° C., and a step of applying re-heating to the tempered member in air at a temperature of lower than 400° C. (preferably 150–350° C.), thereby forming an oxide layer of 1 to 1000 nm thickness comprising iron/chromium oxide series to the surface of the member to increase the surface hardness to Hv 650 or higher (preferably Hv 700 or higher). In this second manufacturing method, the tempering temperature is higher than that in the first manufacturing method and the temperature of applying re-heating in air to form the oxide layer comprising iron/chromium series is also higher than that in the former, and this is suitable to a case in which Mo having high tempering resistance is contained in the ingredient composition for the member to be heat treated.

BRIEF DESCRIPTION OF THE DRAWINGS

FIG. 8 is a table showing conditions for re-heating oxidation to each of test specimens in Comparative Test 1.

FIG. 9 is a table showing test results of Comparative Test 1.

FIG. 10 is a table showing the test results of Comparative Test 2.

FIG. 11 is a table showing the test results of Comparative Test 3.

FIG. 12 is a table showing the test results of Comparative Test 4.

FIG. 13 is a table showing material ingredients of each test specimens and tempering heat treatment conditions in Comparative Test 5.

FIG. 14 is a table showing conditions for re-heating oxidation and test results of Comparative Test 5, FIG. 15 is a table showing material ingredients and conditions of heat treatment (primary tempering) for each of test specimens in Comparative Test 6.

FIG. 16 is a table showing conditions of re-heating oxidation (secondary heating), the oxide layer thickness and the surface hardness for each of test specimens in Comparative Test 6.

FIG. 17 is a table showing test results of Comparative Test 6.

FIG. 18 is a table showing test results of Comparative Test 7.

EXPLANATION OF NUMERALS

1 . . . rolling bearing,
2 . . . outer ring (fixed ring),
3 . . . inner ring (rotational ring),
4 . . . rolling element.

BEST MODE FOR PRACTICING THE INVENTION

The present invention is described in detail with reference to the drawings.

Figure 1:
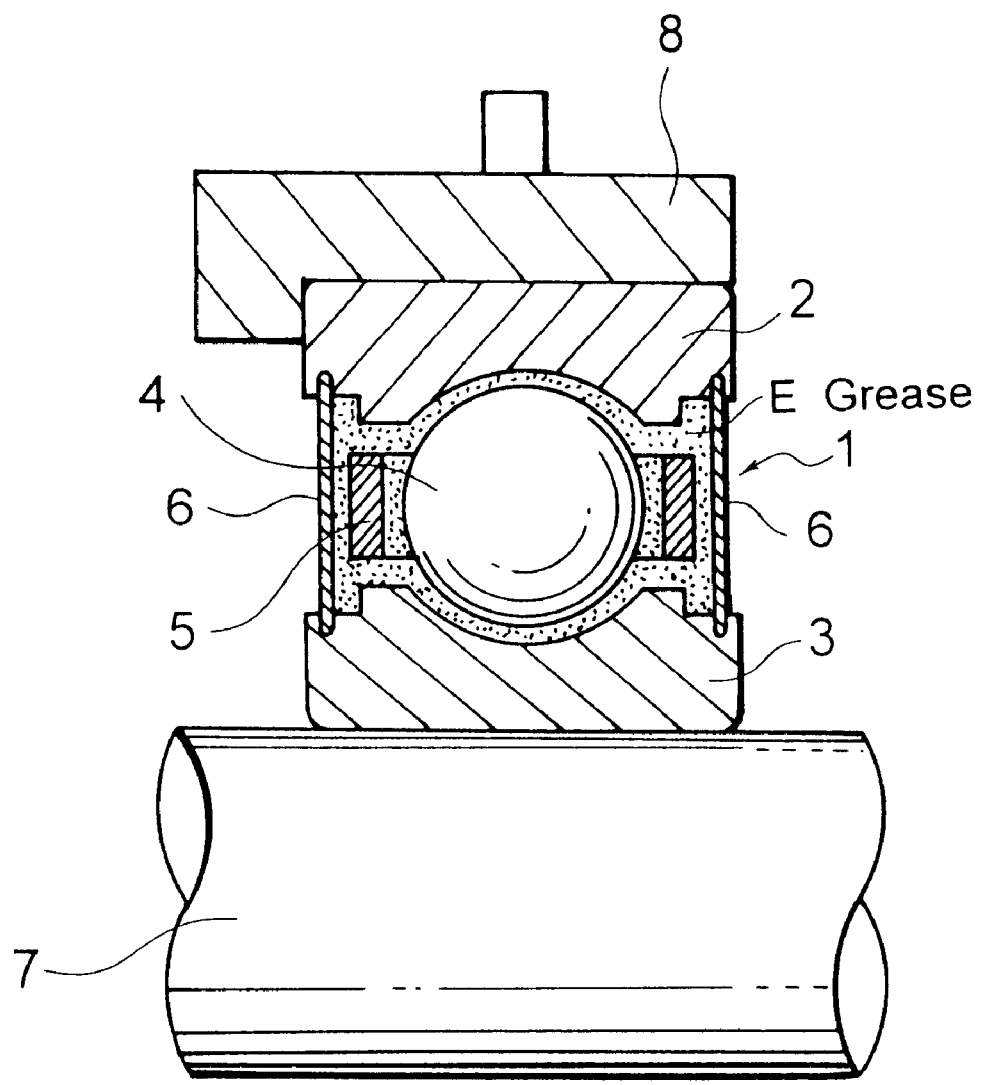
FIG. 1 is a cross sectional view for a main portion of a preferred embodiment of a rolling bearing according to the present invention.

FIG. 1 is a cross sectional view for a main portion of a preferred embodiment of a surface-treated rolling bearing according to the present invention. In the drawing, reference numeral 1 denotes a deep groove ball bearing for inner ring rotation. In the illustrated rolling bearing 1, an outer ring 2 is fixed to a housing 8 and an inner ring 3 is assembled to a shaft 7. Between the outer ring 2 and the inner ring 3, a plurality of rolling elements 4 held by a cage 5 are arranged. Openings between the outer ring 2 and the inner ring 3 situated on both sides of the cage 5 are covered with seal members 6 attached thereto. An E grease is sealed in a space surrounded by the seal members 6 and the outer ring 2 and the inner ring 3. Then, the inner ring 3 also rotates along with the rotation of the shaft 7 and vibration/load caused by the rotation exert from the shaft 7 by way of the inner ring 3 and the rolling element 4 to a load region of the outer ring 2.

For the outer ring 2, the inner ring 3 and the rolling element 4 of the rolling bearing 1, usual second class bearing steel can be used as the alloy steel for the material, which can be used by applying usual heat treatment (direct hardening, for example, heating at 840° C. for hardening, oil-cooling and then tempering at 180° C.). Alternatively, a material applied with carburization or carbo-nitridation can be hardened and tempered for use.

For a rolling bearing applied with usual heat treatment, thermal oxidation is further applied before assembling, for example, to the outer ring 2 and the inner ring 3 in air divisionally for once to three times at a temperature from 100 to 450° C. for several minutes. This heating is referred to as re-heating oxidation in the present invention. The re-heating oxidation forms a layer (oxide layer) comprising an iron/chromium oxide series to each of the raceway surfaces of the outer ring and the inner ring. Subsequently, grease is sealed in the assembled rolling bearing to make a rolling bearing according to the prevent invention.

On the other hand, in a case of applying carburization or carbo-nitridation, an oxide layer comprising iron/chromium oxide series is formed on the raceway surface by applying carburization or carbo-nitridation, applying tempering at 400° C. or higher (preferably 400 to 500° C.) after hardening, applying grinding and then heating at least for once in air at a temperature of lower than 400° C. (preferably from 150 to 350° C.)

By the way, the re-heating oxidation applied to the rolling bearing according to the present invention is quite different from the high temperature tempering applied to the rolling bearing disclosed, for example, in Japanese Patent Examined Publication No. 7-72565. That is, in the disclosure of this publication, residual austenite is decreased to 0.05–6 vol % by applying tempering to the outer ring of the bearing under heating for a long time at a tempering temperature of from 250 to 380° C. thereby intending to prevent plastic deformation caused by decomposition of the residual austenite, in which an oxide layer is not formed by further applying re-heating after the tempering. It can not be expected to prevent early peeling of the bearing under high temperature and high load by merely controlling the amount of the residual austenite. On the contrary, in the present invention, the early peeling is prevented by forming the oxide layer comprising the iron/chromium oxide series to the surface of the bearing member by the re-heating oxidation after the tempering, which is different from mere tempering treatment at high temperature.

The re-heating oxidation in the present invention can be applied to all of the outer ring 2, the inner ring 3 and the rolling element 4 as the constituent members of the rolling bearing, or it may be applied selectively to one or two members of them. Further, in a case of applying the treatment to the outer ring 2 and the inner ring 3 as the bearing ring, it may be applied to the entire surface thereof, or may be applied at least only to the raceway surface of the bearing ring.

Further, in the re-heating oxidation according to the present invention, in a case of not applying carburization or carbo-nitridation, the re-heating temperature in air is within a range for example, from 100° C. to 450° C. The treatment takes an excessive time if the temperature is lower than 100° C., while the oxide layer forms thick scales and is embrittled to frequently cause pits as peeling initiation points on the surface if it exceeds 450° C. The time for the re-heating oxidation varies depending on the temperature. The re-heating oxidation may be applied by heating for once or heating divisionally for several times.

Also in a case of applying carburization or carbo-nitridation, the re-heating temperature in air is lower than 400° C. If the temperature is 400° C. or higher, the oxide layer forms thick scales.

The thickness of the iron/chromium oxide series layer formed on the surface of the bearing members by the re-heating oxidation according to the present invention is from 1 nm to 1000 nm and preferably from 5 to 100 nm. If the thickness of the layer is less than 1 nm, it is too thin to obtain necessary bearing life. On the other hand, if it exceeds 1000 nm, fragile oxide scales are formed to worsen the surface roughness and pits are frequently formed on the surface as the peeling initiation points.

The hardness of the bearing members before applying the re-heating oxidation according to the present invention is preferably HRC 58 or higher in a case of not applying carburization or carbo-nitridation. If the hardness HRC is lower than 58, the rolling contact fatigue life is deteriorated.

The surface hardness of the bearing member formed with the iron/chromium oxide series layer by re-heating oxidation after carburization or carbo-nitridation is preferably higher than Hv 650 (HRC 57.9) and the rolling contact fatigue life is deteriorated if it is lower than HV 650.

Explanations are to made to various "comparative tests" conducted for the rolling bearings according to the present invention and the rolling bearing of comparative examples. Comparative tests (1)–(5) are for the case of not applying carburization or carbo-nitridation and Comparative tests (6) and (7) are for the case of applying carburization or carbo-nitridation.

(1) Comparative Test 1: Life Test under Lubrication with Water-Incorporated Lubricant 1-1: Tested Bearing In the life test, inner and outer rings and rolling elements of rolling bearings as test specimens were made of identical second class bearing steels, which were previously applied with usual heat treatment (heating at 840° C. for hardening, oil-cooling and then tempering at 180° C.) were used both in the examples and the comparative examples. In the rolling bearings as the test specimens used for the comparative test, the surface hardness of the inner and outer rings and the rolling elements was within a range from HRC 57 to 63, the amount of residual austenite was within a range from 7 to 20%, the surface roughness of the inner and outer rings was within a range from 0.01 to 0.04 μm Ra and the surface roughness of the rolling element was within a range from 0.003 to 0.010 μm Ra.

A predetermined number of the inner rings and the outer rings for tested bearings after usual heat treatment, as shown a table in FIG. 8, were applied with re-heating oxidation in air at a temperature from 100 to 450° C. for several minuets, divisionally for once to three times, to form iron/chromium oxide series layers on the raceway surfaces.

A table shown in FIG. 8 shows the thickness of the oxide layer formed to each of the tested bearings, the bearing hardness and the heating method of re-heating oxidation for examples and comparative examples.

In this test, usual steel balls not applied with re-heating treatment were used for the rolling element both in the examples and the comparative examples. Only for Comparative Example 1, usual bearings not applied with re-heating treatment also for inner and outer rings were used. In Comparative Example 4, black coating was applied.

1-2: Testing Apparatus and Method

Figure 2:
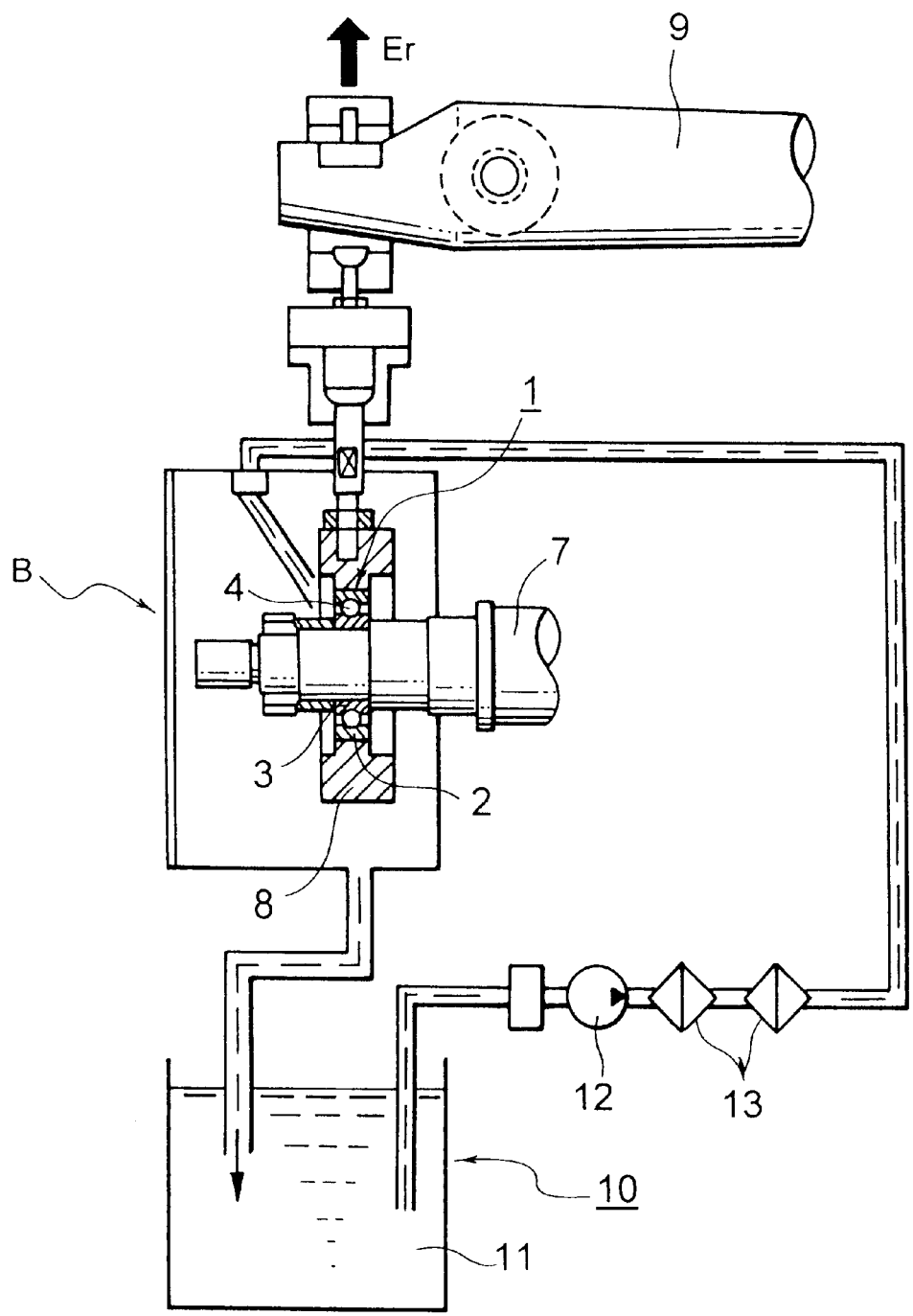
FIG. 2 is a schematic view for one example of a life tester used for rolling bearings.

Using a tester shown in FIG. 2, a test was conducted under lubrication with lubricant vG 68 incorporated with 5% tap water. The tested bearing series form was the JIS bearing number 6206 deep groove ball bearing, the test load was; Fr=900 kgf and the number of rotation was 3900 rpm. The number of test specimens for each case was: n=10. Further, as the judgment for the completion of the test, the test was interrupted at the instance that the vibrations increased five times the initial vibration value, to confirm flaking. The test termination time was set to 100 hr.

FIG. 2 is a schematic view for the constitution of a main portion of a tester, in which B denotes a test section box. 1 denotes a rolling bearing as a test specimen, 2 denotes an outer ring (fixed) thereof, 3 denotes an inner ring (rotational ring) and 4 denotes a rolling element. The tester comprises a shaft 7 for rotationally driving a bearing, a housing 8 that accommodates the bearing, and a load shaft 9 for loading a radial load to the bearing, to which a lubricant circulating oil feed device 10 is appended. The inner ring 3 is mounted to the rotational shaft 7 integrally rotatably, while the outer ring 2 is fixedly supported to the housing 8. The oil feed device 10 is adapted to pump up lubricants in an oil tank 11 by a pump 12 and continuously feed the oil by way of a filter 13 to the rolling bearing 1 as a test specimen. A loading test was conducted for a predetermined period of time at a predetermined number of rotation by rotating the inner ring 3 by the driving of the shaft 7 and loading a test load Fr to the bearing by the load shaft 9.

1-3: Test Results

A table shown in FIG. 9 shows an evaluation time (bearing life) and presence or absence of peeling (fracture) on every specimens as test results.

Figure 3:
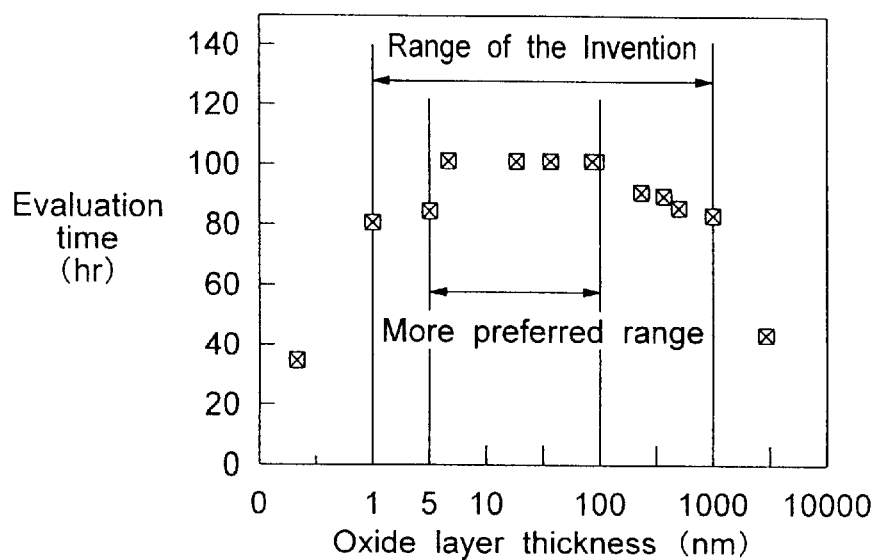
FIG. 3 is a view showing a relation between the thickness of an oxide layer and a bearing life.

Further, FIG. 3 shows a graph for a relation between the thickness of an oxide layer shown in Table 1 on every specimen and the evaluation time (bearing life) shown in Table 2.

In Examples 1 and 3, an iron/chromium oxide series layers were formed by 1 nm and 3 nm, respectively, but four and three out of 10 test specimens caused peeling in the outer ring. As a result of observation for the peeled surface of the raceway surface of the bearings, fracture for the oxide layers was recognized in the outer ring while the oxide layer of the inner ring remained as it was. $L_{10}$ life was 70 hr and 82 hr, respectively.

For Examples 2, and 4 to 8, the oxide layer was formed to 5–100 nm thickness and no peeling occurred even at 100 hr which is about twice as long as the calculated life. Further, as a result of observation for the bearing raceway surface after the test, the iron/chromium oxide series layer was present on the rolling surface of the inner and outer rings and no fracture of the layer was recognized.

For Examples 9 to 12, the peeling life was 84 to 91 hr and it did not reach 100 hr. While the thickness of the oxide layer was sufficient as 225 to 1000 nm, the hardness of the peeled bearing was HRC 57 near the peeled portion when it was measured after the completion of the test and it is considered that peeling occurred since the hardness was lowered compared with the bearing hardness of HRC 59 to 63 in the not-peeled portion.

In Example 13, since hardness was uneven and lowered to HRC 58, peeling occurred in one out of 10 outer rings.

In Example 14, the oxide layer thickness was 100 nm and the hardness was HRC 59 and no peeling occurred.

In Example 15, while the oxide layer thickness was 1000 nm, since hardness was maintained at HRC 60 (hardness was improved by the effects of sub-zero treatment), peeling did not occur even at the evaluation time of 100 hr.

On the other hand, in Comparative Example 1, since this was a bearing not treated with the iron/chromium oxide series layer, peeling occurred in 10 out of 10 specimens and the $L_{10}$ life was 12 hr which was ¼ of the calculated life. In Comparative Example 2, since the thickness of the iron/chromium oxide series layer was as small as 0.2 nm, the layer on the outer ring raceway surface was completely fractured after the completion of the test, peeling occurred in all of the test specimens and the $L_{10}$ life was 35 hr.

In Comparative Example 3, while 3 µm oxide layer was formed on the raceway surface, scales were formed entirely on the raceway surfaces to cause embrittlement and a number of pits were formed on the surface. Peeling was present both in the inner ring and the outer ring and, accordingly, peeling occurred at pit initiation points thereof and the $L_{10}$ life was 45 hr.

In Comparative Example 4, black coating was applied but, since the surface roughness of the bearing ring was worsened as 0.1 µm Ra, the bearing vibration was large and the test was interrupted in the course thereof for as much as 5 out of 10 specimens and the life was also poor.

As apparent from FIG. 3 showing the foregoing results collectively, it can be said that the range for the thickness of the oxide layer by the re-heating oxidation according to the present invention is from 1 to 1000 nm and, more preferably, within a range of from 5 to 100 nm.

(2) Comparative Test 2: Life Test under the Lubrication of Sealed Grease Incorporated with Water 2-1: Tested Bearing In Comparative Test 1, lubricants incorporated with 5% water were used as the lubricants but a rolling bearing 1 having grease incorporated with 3% water sealed therein was used as the bearing of the test specimen in this test. In the used grease, a dialkyl diphenyl ether was used as a base oil and a diurea series compound was used as a viscosity increasing agent with 15% amount of the viscosity increasing agent. In this case, since abrupt increase of the test temperature by the heat generation of grease was expected, the test was conducted at a bearing temperature of 70 to 80° C. while cooling the housing under control by using a cooling device.

As the bearings for the test specimen, those applied with the same treatment as in Examples 1, 2, 6 and 12 and Comparative Examples 1, 2 and 3 were selected from those used in Comparative Test 1 (refer to Table 1), to which grease was sealed to manufacture bearings. In Comparative Example 1, the test bearing was manufactured by sealing grease without applying re-heating oxidation after usual heat treatment and grinding.

2-2: Testing Apparatus and Method

A tester shown in FIG. 2 was used. However, the lubricant circulating feed device was not used.

The tester, tested bearing type, the test load and the number of rotations were the same as those in Test 1. The number of test specimens, judgment for the completion of the test and the test termination time (evaluation time) were also identical with those in Test 1.

2-3: Test Results

A table shown in FIG. 10 shows the evaluation time and the situation of peeling (fracture).

In Examples 1, 2 and 6, oxide layers of 1 nm and 100 nm were formed and no peeling occurred till 100 hr. Further, as a result of observation for the rolling surface after the test, the oxide layers remained intact and no fracture was observed. It is considered that the layer was not abraded in the Test 2 since it suffered from less effects of water in the grease compared with the Test 1.

Further, in Example 12, the hardness was low and the life $L_{10}$ was 83 hr, to provide substantially the same results as those in the Test 1.

In Comparative Examples 1 and 2, the peeling life was: $L_{10}$=31 hr and 47 hr. The peeling life was longer and the fracture of the oxide layer on the rolling surface was also smaller compared with those the Test 1.

In Comparative Example 3, peeling was induced from the pit initiation point like that in the Test 1 to provide same results as those in the Test 1.

It can be said from the foregoing results that it is possible to suppress stress corrosion cracking type peeling caused by intrusion of hydrogen formed by the decomposition of water contained at several % in the lubricants by disposing an iron/chromium oxide series layer (re-heating oxide layer forming treatment) with the thickness of 1 to 1000 nm to the surface of the bearing under such a condition as water intrudes into the inside of the bearing. In view of shortening for the heating time and the peeling resistant life, it is considered that the thickens of the iron/chromium oxide series layer is preferably from 5 to 100 nm.

(3) Comparative Test 3: Creep Test

This is a test for investigating the effects of the amount of residual austenite in the rolling bearings under water-incorporated lubrication on the bearing life and the bearing performance collectively.

3-1: Tested Bearing

For the bearing as the test specimens, those applied with the re-heating oxidation as in Examples 1, 2, 6, 12, 13, 14 and 15 and Comparative Examples 1, 2 and 3 were selected from those used in Comparative Test 1 (refer to the table shown in FIG. 8). However, in the preceding heat treatment, they were applied with a sub-zero treatment (−60° C.) or high temperature tempering (200 to 300° C.) after hardening by heating at 840° C. to vary the amount of residual austenite (vol %) respectively (refer to Table 4). As the lubricants, lubricant vG 68 incorporated with 5% tap water was used.

3-2: Testing Apparatus and Method

Test was conducted by using the tester shown in FIG. 2 at the same number of rotation of 3900 rpm. However, the test load was: Fr=450 kgf, and the test was conducted at a test temperature of 150° C. by heating the test section box B per se and not circulating lubricants, and absence or presence of peeling and scorching/creeping was determined for the bearings as the test specimens. The number of specimens in each case was n=10 and the test termination time was 350 hr since the calculated life was 350 hr.

3-3: Test Results

A table shown in FIG. 11 shows the thickness of oxide layers, the amount of residual austenite and the bearing hardness, as well as the evaluation time and presence or absence of scorching/creeping for each of the test specimens.

In Example 1, since the amount of residual austenite (γR) was as high as 15%, γR was decomposed to expand dimensionally and, as a result, creeping occurred in four specimens in a high temperature test. Since the thickness of the oxide layer was 1 nm, the scorching resistance was favorable.

In Example 2, since γR was as high as 13%, creeping occurred in four specimens. Since the thickness of the oxide layer was 5 nm, the scorching resistance was favorable.

In Example 6, since γR was as high as 9%, creeping occurred in three specimens but there was no problem for the scorching resistance since the thickness of the oxide layer was 100 nm.

In Example 12, since γR was as high as 7%, creeping occurred in two specimens but the thickness of the oxide layer was 1000 nm, and there was no problem for the scorching resistance.

In Example 13, γR was 0% and the evaluation time satisfied 350 hr and neither scorching nor creeping was recognized.

In Example 14, γR was 6% and some creeping occurred.
In Example 15, γR was 3% and some creeping occurred.

In Comparative Example 1, since there was no oxide layer, five specimens were stopped by scorching and, since γR was as high as 13%, they were dimensionally expanded and creeping occurred in five specimens. After all, scorching or creeping occurred for total number of the specimens.

In Comparative Example 2, since the oxide layer was as thin as 0.2 nm, scorching occurred in five specimens. In Comparative Example 3, while the oxide layer was as thick as 3000 nm, the oxide layer was tended to be peeled and scorching occurred in three specimens since the test was conducted at high temperature.

Figure 4:
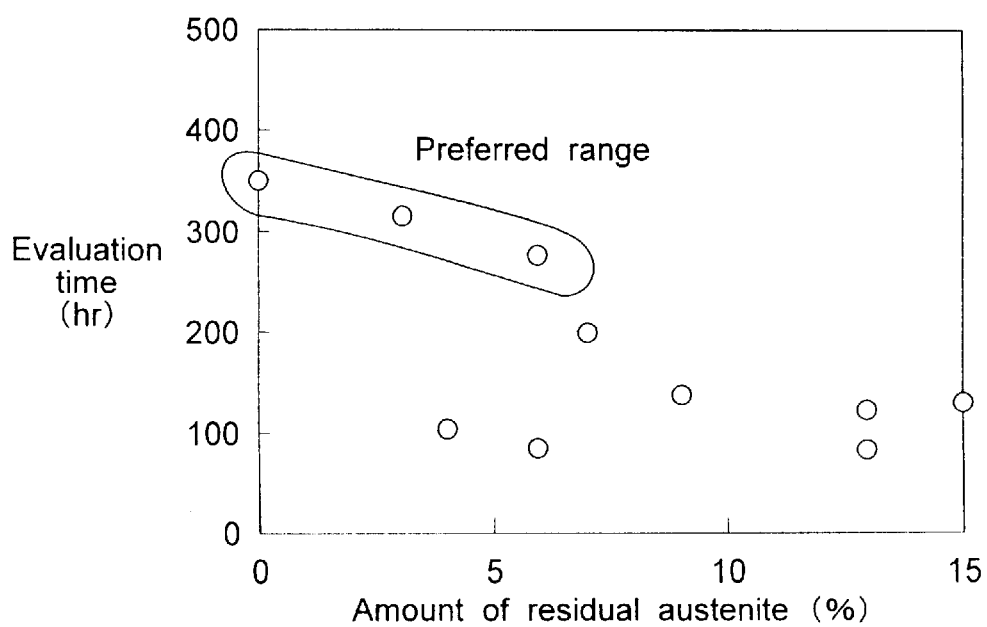
FIG. 4 is a view showing a relation between the amount of residual austenite in a bearing as a test specimen and a bearing life.

FIG. 4 shows determination for a relation between the amount of residual austenite (γR) shown in FIG. 1 and the time of occurrence of scorching/creeping. As apparent from FIG. 4, it can be seen that the life and the bearing performance (prevention of creeping) can be improved further under water-incorporated lubrication by reducing γR to 6.0 vol % or less in addition to satisfying the thickness of the re-heating oxidation treated layer according to the present invention.

(4) Comparative Test 4: In a case of Rolling Bearings for Use in Engine Auxiliaries Rolling bearings for use in engine auxiliaries were used as test specimens. The engine auxiliaries include alternators, solenoid clutches, intermediate pulleys, compressors and water pumps for car-mounted air conditioners. Also for such equipments, higher performance and higher power have been demanded as well as for downsizing and weight reduction along with downsizing and weight reduction of automobiles. Accordingly, upon operation of engines, high vibrations and high loads (about 4G–20G of gravitational acceleration) caused by high speed rotation exert simultaneously by way of belts to the bearings, for example, to the bearings of an alternator. Then, as described previously, the lubricant membranes are fractured between the rolling element and the raceway surface and hydrogen ions formed by the decomposition of water in the grease are adsorbed on the raceway surface at the fractured sites and act as hydrogen atoms and, as a result, early peeling occurs, in the rolling bearing, particularly, to the outer ring as the fixed ring, tending to shorten the bearing life. Then, it was investigated for the effect of improving the bearing life by the re-heating oxidation treated layer of the present invention in such situations.

4-1: Tested Bearing

The rolling bearings as test specimens used in this life test were those applied with the same treatment as in Comparative Test 1. That is, JIS bearing number series 6303 made of second class bearing steel material were used for all of the outer rings, the inner rings and the rolling elements, to which usual heat treatment were applied (for example heating at 840° C. for hardening, oil-cooling and then tempering at 180° C.). The surface hardness was HRC 57 to 63, the amount of residual austenite was 7–20%, the surface roughness for the inner and outer rings was from 0.01 to 0.04 μm Ra and the surface roughness of the rolling element was 0.003 to 0.010 μm Ra. Then, after applying the usual heat treatment, the outer and inner rings were further applied with re-heating oxidation in air at a temperature from 100 to 450° C. for several minutes, divisionally for once to three times to form iron/chromium oxide series layers (iron oxide series layer) to each of the raceway surfaces of the outer and inner rings. As shown in FIG. 1, E grease incorporated with 0.1% water content was sealed in the rolling bearings manufactured by assembling the members to provide test specimens. However, in Comparative Example 1, test bearing was manufactured by sealing grease without applying re-heating oxidation after the usual heat treatment and grinding.

4-2: Testing Apparatus and Method

Figure 5:
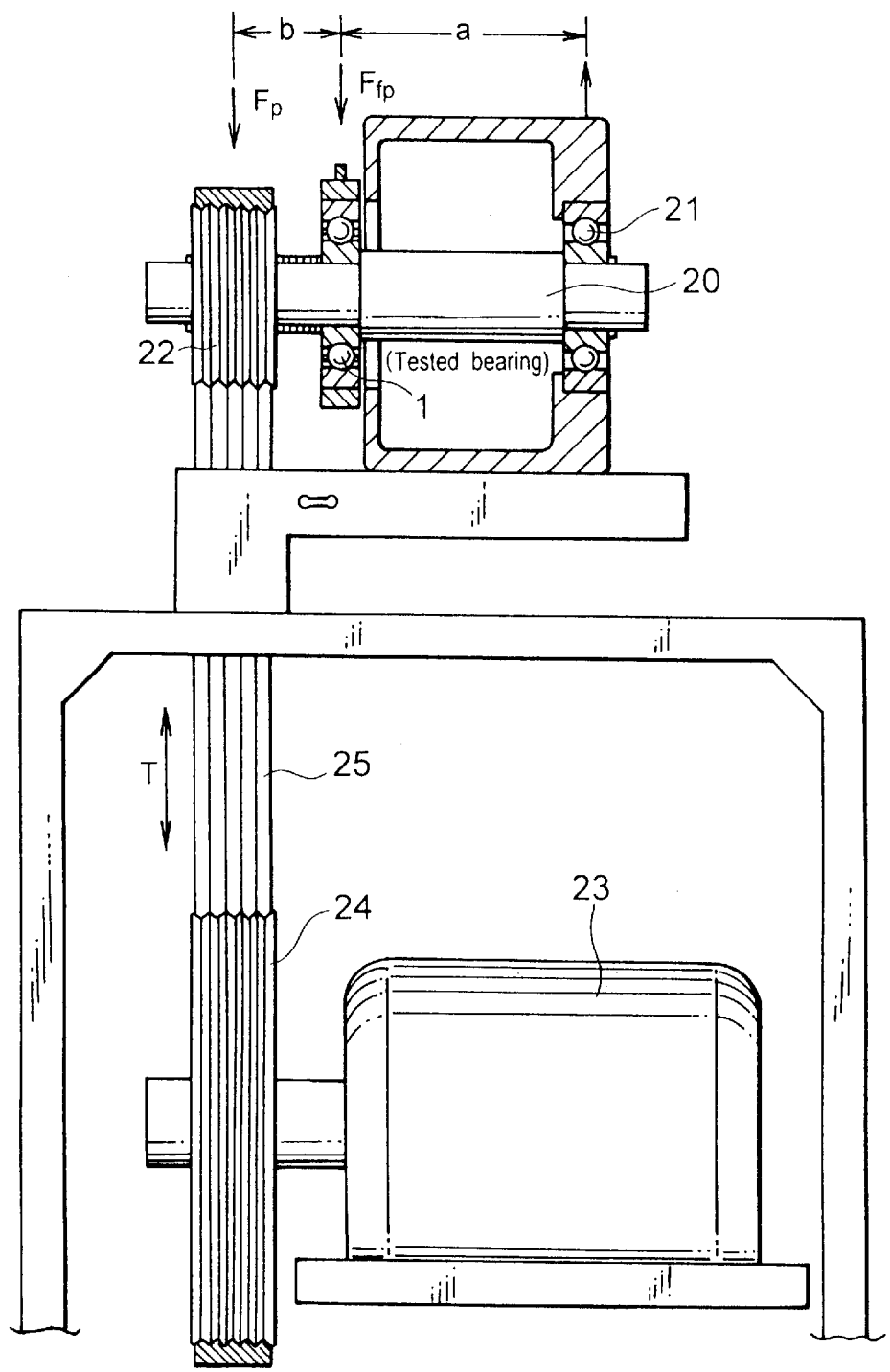
FIG. 5 is a schematic view for another example of a life tester used for rolling bearings.

A tester shown in FIG. 5 was used. This is an acceleration/deceleration tester disclosed in Japanese Patent Unexamined Publication No. 9-89724, which can switch the number of rotations between 9000 rpm and 18000 rpm on every predetermined period of time (for example, on every 9 sec), and in which a rotational shaft 20 is horizontally supported by a support bearing 21 and a bearing 1 as a test specimen, and a follower pulley 22 fixed to the end of the rotational shaft 20 is connected by way of an endless belt 25 to a driving pulley 24 driven by a driving motor 23. The supporting rigidity of the support bearing 21 is made higher while the supporting rigidity of the bearing 1 as the test specimen is made lower. Then, the rotation of the driving motor 23 is transmitted by way of the driving pulley 2 and the endless belt 25 to the follower pulley 22 to apply a radial load Fp to the rotational shaft 20.

When the radial load Fp is loaded from the follower pulley 22 to one end of the rotational shaft 20, a radial load $F_{fp}$ of: (a+b)·Fp/a exerts on the bearing 1 as the test specimen that rotatably supports an intermediate portion of the rotational shaft 20. In this case, a is a center-to-center distance between the support bearing 21 and the bearing 1 as the test specimen (pitch) and b is a center-to-center distance between the driven pulley 25 and the bearing 1 as the test specimen.

According to the acceleration/deceleration tester, test for the life of the bearing 1 as the test specimen can be conducted corresponding to the state where it is assembled in auxiliaries for use in engines and actually operated. That is, since the supporting rigidity of the bearing 1 as the test specimen disposed at the intermediate portion of the rotational shaft 20 is lower, a bending stress exerts on the rotational shaft 20 by the radial load exerted on the follower pulley 22 based on a tension T of the endless belt 25. Then, the bending stress and the radial load Fp exerted from the endless belt 25 are combined, to apply a complicate force just corresponding to the actual state of using the bearing 1 as the test specimen. Damages such as early peeling occurs by this force. Further, moisture contained in air is absorbed during rotational driving into the grease sealed in the bearing 1 as the test specimen. As described above, according to this acceleration/deceleration tester, since the bearing 1 as the test specimen can be placed in a state just corresponding to the actual state of using the bearing 1 as the test specimen, a life test at a high reliability can be conducted while setting the loaded weight and the rotational speed to such values as just corresponding to the actual state of use.

The loading condition was set as P (loaded weight)/C (dynamic rated weight)=0.10. Further, the calculated life for the bearing 1 as the test specimen was 1350 hr in this case and, accordingly, the test termination time was set to 1500 hr. The number of test specimens for each case was: n=10.

4-3: Test Results

A table shown in FIG. 12 shows the evaluation time (life), presence or absence of peeling (fracture), the thickness of the iron/chromium oxide series layer and the heating method of the oxide layer forming treatment.

Figure 6:
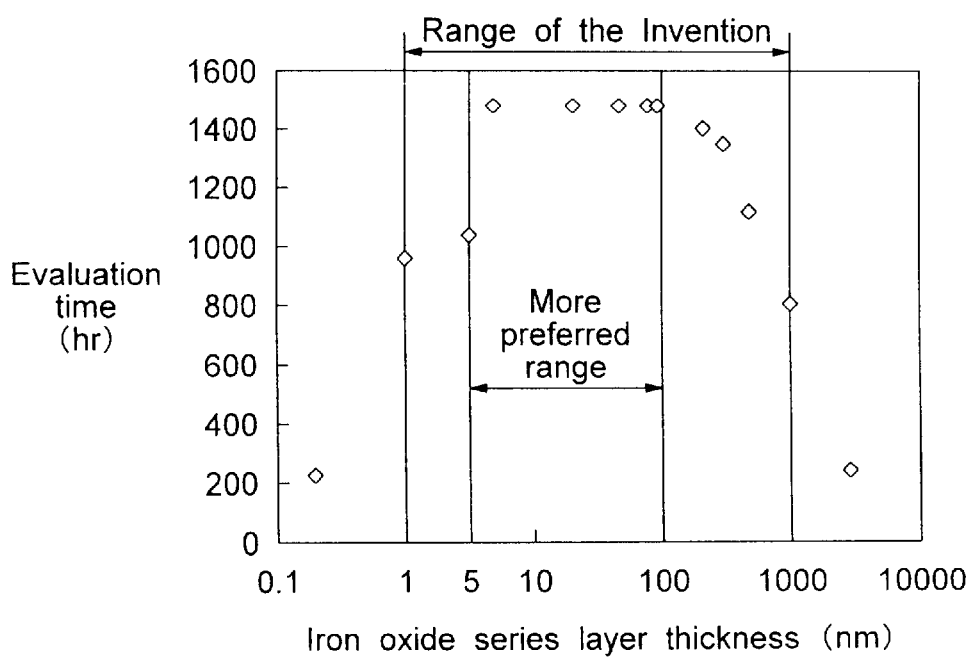
FIG. 6 is a view showing a relation between the thickness of an oxide layer of a rolling bearing and a bearing life under high vibrations/high load.

FIG. 6 shows a relation between the thickness of the oxide layer and the evaluation time as a graph.

In Examples 1 and 3, while oxide layers were formed to 1 nm and 3 nm thickness respectively, four out of 10 bearings as the test specimen caused peeling at the outer rings and the $L_{10}$ life was 985 hr and 1057 hr respectively. It is considered that this is attributable to that fracture was greater in the oxide layer on the outer ring raceway surface compared with that in the oxide layer on the inner ring raceway surface.

In Examples 2 and 4 to 8, the oxide layers were formed to a thickens of 5 to 100 nm and no peeling occurred even at 1500 hr which is longer than the calculated life. Further, when the bearing raceway surface was observed after the test, oxide layers were present and no layer fracture was recognized.

In Examples 9, 10, 11 and 12, the peeling life was 1424, 1378, 1125 and 816 hrs, respectively, and peeling in the outer rings and the peeling in the inner rings were present together. This is considered that while the thickness of the oxide layers per se was sufficient as 225, 310, 485 and 1000 nm, respectively, the hardness of peeled bearing surfaces was HRC 57 in some specimens when measured after the completion of the test, which was lowered compared with the hardness of the not-peeled portion, so that peeling occurred.

On the other hand, in Comparative Example 1, since bearings were not applied with re-heating oxidation, the thickness of the oxide layers was 0 nm and, as a result, peeling occurred in the outer ring in the total number, that is, 10 out of 10 specimens, and the $L_{10}$ life was 124 hr which was ⅒ of the calculated life.

In Comparative Example 2, since the thickness of the oxide layer was as thin as 0.2 nm, the oxide layer on the raceway surface was fractured after the completion of the test and the peeling occurred in the outer ring for the total number, that is, 10 out of 10 specimens, and the $L_{10}$ life was 215 hr, which was ⅐ of the calculated life.

In Comparative Example 3, while oxide layers were formed to a thickness of 3000 nm on the raceway surface, all of them were formed as scales and embrittled to cause a number of pits on the surface. Further, the peeled portions were present both in the inner ring and the outer ring. Accordingly, peeling occurred at the pit initiation points and the $L_{10}$ life was as short as 239 hr.

From the foregoing results, it is apparently possible to suppress stress corrosion cracking type peeling due to intrusion of hydrogen formed by the decomposition of water contained by several % in lubricants, under high vibrations and high loads, by disposing the iron/chromium oxide series layer (re-heating oxidation treated layer) to a thickness of 1 to 1000 nm on the surface of the bearing. Then, as apparent also from FIG. 6, it can be said that the thickness of the iron/chromium oxide series layer is preferably from 5 to 100 nm in view of shortening of the re-heating treatment time and peeling resistance life.

(5) Comparative Test 5: In a Case of Rolling Bearings for Use in Engine Auxiliaries Applied with Dimensional Stability Treatment Successively, a comparative test was conducted using those applied with dimensional stabilization by controlling the amount of residual austenite (γR) in the bearing material by high temperature tempering.

5-1: Tested Bearing

For bearings as test specimens, JIS bearing number 6303 using second class bearing steels as a material were used for each of the outer bearings, inner bearings and rolling elements. As the heat treatment condition, bearings were heated at a temperature of 840° C. for hardening, oil-cooled and then applied with high temperature tempering within a range from 240 to 320° C. in a case of examples. In a case of comparative examples, two types of bearings, that is, those hardened by heating at a temperature of 840° C., oil-cooled and then tempered usually within a range from 160° C. to 200° C. and those applied with high temperature tempering at 240° C. or 360° C. were provided. In the heat treatment for Example 54, Example 59 and Comparative Example 59, bearings were heated at 840° C. for hardening, further applied with a sub-zero treatment at −80° C. and then tempered.

After the tempering, the inner rings and the outer rings of the bearings of the examples were re-heated in air to form oxide layers of 5 to 100 nm thickness on the raceway surfaces. In the bearings of the examples, the temperature for the re-heating treatment was set to a temperature lower by 30° C. or more than the tempering temperature in all of the cases. For bearings in the comparative examples, those treated in the same manner by the re-heating treatment to be formed with oxide layers and those not formed with them were provided. The re-heating treatment was conducted by combining the heating temperature and the processing time variously. The surface hardness was HRC 56 to 64 and the amount of the residual austenite was 0 to 6 (vol %) for each of members of the inner rings, the outer rings, and the rolling elements, the surface roughness of the inner ring and the outer ring was from 0.01 to 0.04 μm Ra, and the surface roughness of the rolling elements was 0.003 to 0.010 μm Ra for the test specimens.

A table shown in FIG. 13 shows the ingredient compositions of the material for each of the test specimens.

In this case, the ingredient compositions of alloys in the surface-treated roll bearing according to the present invention are defined as described below, and the critical meaning thereof is to be explained with reference to the table in FIG. 13. This definition is applied to at least one of the inner ring or the outer ring, or the rolling element.

C: 0.7–0.93% by Weight

C is an element for providing steels with hardness. If the C content is less than 0.70%, hardness required for the rolling bearing (Rockwell hardness HRC 58 or more in a case of scale C) can not sometimes be ensured. Further, C is solid solubilized in the matrix and combined with other alloying ingredients (particularly Cr) to form carbides. If the C content exceeds 0.93% by weight, macro-carbides tend to be formed during steel making to cause a worry of deteriorating the fatigue life or the impact resistance.

Si: 0.15–0.50% by Weight

Si is an element that acts as a deoxidizer during steel making to improve the hardenability and is also effective for extending the bearing life by reinforcing the martensite in the matrix phase. For substantially obtaining such a life extending effect, Si has to be incorporated by 0.15% by weight or more. On the other hand, as the Si content increases, cutting property, forgeability and cold workability are deteriorated. The upper limit for the Si content is defined as 0.5% by weight in order to make the workability to the same extent as that of SUJ2.

Mn: 0.50–1.10% by Weight

Mn is an element for reinforcing ferrite in the steel and, as the content exceeds 1.10% by weight, the cold workability is deteriorated remarkably. On the other hand, Mn is an element for enhancing the deoxidizing effect and the hardenability but such effects can not be obtained substantially if the content is less than 0.50% by weight.

Cr: 0.30–0.65% by Weight

Cr is an element for providing effects of improving the hardenability, improving the anti-temperability and improving the abrasion resistance but the effects can not substantially be provided if the content is less than 0.30% by weight. On the other hand, it may be a worry that Cr is bonded with C to form macro-carbides and the upper limit for Cr is defined as 0.65% by weight for avoiding this worry.

5-2: Testing Apparatus and Method

A tester as shown in FIG. 5 was used. The number of rotation in the test was determined constant at 1000 rpm. Weight was loaded by the tension of a belt 25. The loading condition was set as: P (loaded weight) /C (dynamic rated weight=0.10. E grease was used for sealed grease. Further, the test was conducted while keeping the temperature for the bearing outer ring at 150° C. as the test temperature. Further, since the calculated life of the bearing in this case was 1700 hr, the test termination time was set to 2000 hr. The test was interrupted at the instance that vibration values reached five times the initial vibration value before it reached the termination time and absence or presence of peeling was confirmed. The number of the test specimens in each case was: n=10.

5-3: Test Results

A table shown in FIG. 14 shows test results.

In Examples 51 and 52, iron/chromium oxide series layers were formed to the thickness of 5 and 15 nm respectively, and peeling was recognized in four for the former and in three for the latter out of 10 test specimens but the $L_{10}$ life was 1850 hr and 1912 hr respectively, which was longer compared with that of comparative examples. However, as a result of observation for the peeled surface after the test, fracture of the iron/chromium oxide series layer was recognized and, therefore, a thicker iron/chromium oxide series layer is more preferred. In Example 53, while the life was longer than that of the comparative example, since the bearing hardness was as low as HRC 58, peeling from pit initiation points occurred at 1790 HR in one out of 10 test specimens. In Examples 54 to 59, oxide layers were formed to the thickness of 20 to 100 nm and no peeling occurred even upon reaching the calculated life of 2000 hr. Further, as a result of observation for the raceway surface of the bearings after the test, the iron/chromium oxide series layers were present and fracture of the layer was not recognized.

On the other hand, since Comparative Example 51 was a bearing not applied with iron/chromium oxide series layer forming treatment and having an amount of residual austenite of 9.5%, scorching occurred in total number, that is, 10 out of ten specimens, and the $L_{10}$ life was 51 hr, which was 1/40 of the calculated life. Since the test was conducted at a high temperature state of 150° C. in this case, dimensional change occurred to cause scorching before peeling occurred. In Comparative Example 52, re-heating layer forming treatment was conducted at 170° C. which was lower by 30° C. than the tempering temperature at 200° C. but since the thickness of the formed iron/chromium oxide series layer was as small as 1 nm, the iron/chromium oxide series layer was fractured peeling occurred in the outer rings for all of 10 specimens as a result of observation for the raceway surface after completing the test, and the $L_{10}$ life was 187 hr, which was 1/11 of the calculated life.

In Comparative Example 53, a thick oxide layer of 250 nm was formed on the raceway surfaces but, since re-heating layer forming treatment was conducted at 300° C., which was higher by 60° C. than the tempering temperature at 240° C., the raceway surface was expanded to worsen the circularity. Further, the initial vibration value after staring the test was large and the test was interrupted at the $L_{10}$ life of 241 hr for all of ten test specimens. Also in Comparative Example 54, while an oxide layer was formed to 30 nm on the surface of the raceway surface, since re-heating layer forming treatment was conducted at a temperature of 250° C. which was higher by 90° C. than the tempering temperature at 160° C., the raceway surface was expanded to worsen the circularity and, since the amount of residual austenite was as large as 5.0%, peeling occurred at a short period of 665 hr of the $L_{10}$ life. Also in Comparative Example 56, while a 57 nm oxide layer was formed on the raceway surfaces, since the re-heating layer treatment forming was also conducted at a high temperature of 270° C. which was higher by 70° C. than the tempering temperature at 200° C., the raceway surface was expanded to worsen the circularity. Further, since the amount of residual austenite was 4.7% and the amount of carbon was as high as 1.38% by weight, macro-carbides were formed on the rolling surfaces and the initial vibration value was increased by composite effects after starting the test and the $L_{10}$ life was as short as 853 hr.

In Comparative Example 57, while an oxide layer was formed to 13 nm on the raceway surface at a temperature lower by 30° C. than the tempering temperature at 200° C., since also the amount of residual austenite was as large as 5.1%, dimensional change occurred before peeling occurred and, after all, they were scorched at a short $L_{10}$ life of 137 hr in a test under a high temperature state of 150° C.

In Comparative Examples 55 and 58, an oxide layer was formed to a thickness of 8 nm on the raceway surface by applying re-heating treatment at the same temperature as the tempering temperature at 160° C. in the former, while an oxide layer was formed to a thickness of 80 nm on the raceway surface by applying the re-heating treatment at 250° C. which was lower by 110° C. than the tempering temperature at 360° C. for the latter, and the surface hardness was as low as HRC 56 in both cases. Accordingly, in Comparative Example 58, the $L_{10}$ life was as short as 750 hr. On the other hand, in Comparative Example 55, since the amount of residual austenite was also as large as 6.9%, the $L_{10}$ life was 48 hr, which was as short as 1/20 of the calculated life.

Further, in Comparative Example 59, while an oxide layer at a thickness of 1500 nm was formed on the raceway surface by the re-heating treatment at the same temperature as the tempering temperature of 360° C., the raceway surface formed scales entirely and was embrittled and a number of pits were formed on the surface. Further, peeled portions were present both in the inner ring and the outer ring. Accordingly, peeling occurred at the pit initiation points and the $L_{10}$ life was as short as 574 hr.

From the foregoing results, it is apparently possible, in bearings put under high temperature/high vibration/high load such as rolling bearings for use in engine auxiliaries, to suppress the stress corrosion cracking type peeling phenomenon on the raceway surfaces occurred due to hydrogen caused by the decomposition of water contained in the lubricants, by applying high temperature tempering at least to the surface of the bearing rings or rolling members of the rolling bearings so as to provide a surface hardness of HRC 58 or more and the amount of residual austenite of 2 vol % or less after usual hardening, applying re-heating in air at a temperature lower by 30° C. than the temperature for the high temperature tempering (re-heating oxidize layer forming treatment), thereby forming iron oxide series oxide layers (re-heating oxide layers) at 5 to 100 nm at least on the rolling surfaces.

In this case, as the alloy material for the bearing rings or the rolling elements of the rolling bearings, it is preferred to use bearing steels that can satisfy C: 0.7–0.93% by weight, Si: 0.15–0.50% by weight and Mn: 0.50–1.10% by weight, Cr: 0.30–0.65% by weight, and the critical meanings for them are as have been described above in the explanation for the table shown in FIG. 13.

Further, the temperature for high temperature tempering is preferably from 240 to 320° C. The amount of residual austenite exceeds 2 vol % if it is lower than 240° C., whereas the hardness is possibly reduced to HRC 58 or lower to shorten the rolling contact fatigue life if it is higher than 320° C.

Further, under the conditions in which the number of rotation increases and operation slipping or autorotation slipping of steel balls as the rolling elements are large, peeling of the steel balls can be suppressed by forming an oxide layer of 5 to 100 nm on the surface of the steel ball. In this experiment, the bearing material was heat treated, ground and then cleaned with white kerosine and then dried spontaneously. It is preferred that oil and fats deposited on the surface of metal after grinding were degreased (for example, with solvent degreasing or alkali degreasing) and then the material is heated in air to form an iron/chromium oxide series oxide layer. In a case where the bearing is used at high rotation and bearing temperature increases, it is more preferred that the bearing is applied with a sub-zero treatment, then with high temperature tempering and then further applied with re-heating oxide layer forming treatment to make the hardness of the bearing to HRC 60 or higher.

Further, also in case hardening steels or those steel materials applied with carburization or carbo-nitridation or induced hardened, the same effects of improving the life can be provided by applying the same re-heating treatment as in the present invention after the hardening heat treatment.

Further, the iron/chromium oxide series oxide layer can be formed also in ozone (at room temperature) in the present invention.

Furthermore, in the oxide layer forming method, it is more efficient to apply the layer forming treatment mainly to the raceway surface by utilizing an induced heating device.

Successively, description is to be made for a comparative test on bearings applied with the oxide layer formation after applying carburization or carbo-nitridation.

Figure 7A:
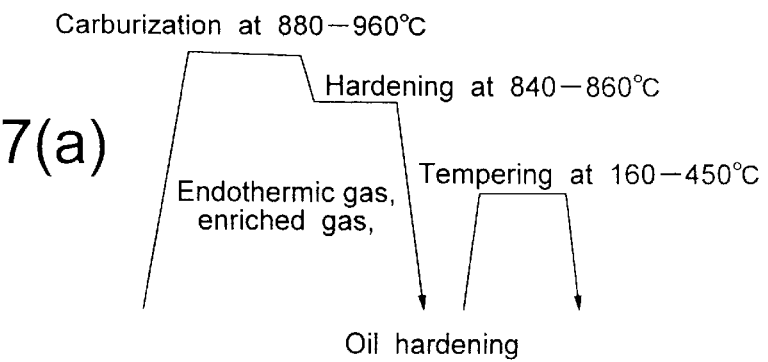
FIG. 7 is an explanatory view for a heat treatment including carburization or carbo-nitridation.
Figure 7B:
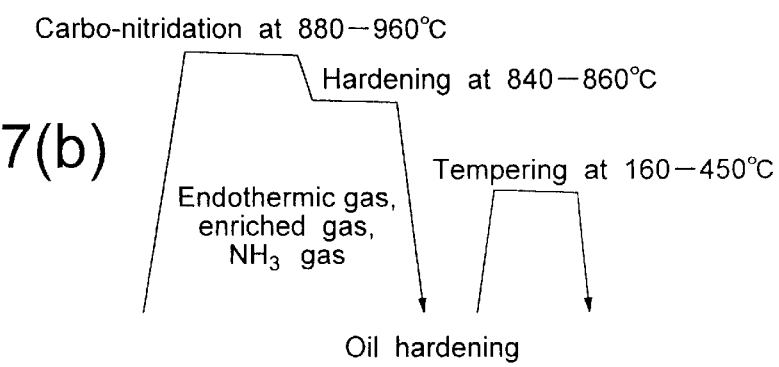

(6) Comparative Test 6: Life Test under Lubrication with Water-Incorporated Lubricants for Bearings Applied with Carburization or Carbo-nitridation 6-1: Tested Bearing Test specimens used for the life test were deep groove ball bearings of JIS bearing number 6206 having the surface roughness for inner and outer rings of from 0.01 to 0.04 $\mu$m Ra. A table in FIG. 15 shows ingredient compositions of the inner and outer rings and conditions for the heat treatment. Both in examples and comparative examples, heat treatment including carburization as shown in FIG. 7(a) and/or carbo-nitridation as shown in FIG. 7(b) was applied to those having ingredient compositions shown in the table of FIG. 15. That is, carburization or carbo-nitridation was applied at 880 to 960° C. in a predetermined carburizing or carbo-nitriding gaseous atmosphere and then hardened at 840 to 860° C. in the same atmosphere. After oil-cooling them, primary tempering was applied at 160 to 450° C. In the table shown in FIG. 15, carburization was not applied to the specimen with no description for the surface N concentration, and carburization was neither applied to the specimen with no description for the surface C concentration. The used rolling elements were made of bearing steels and applied with well-known dimensional stabilizing treatment.

Then, the inner and outer rings of the examples and the comparative examples applied with the treatment described above were heated in an air atmosphere at 150 to 400° C. for several minutes as shown in Table 16, to form iron/chromium oxide series layers on the raceway surfaces of them. Subsequently, bearings were assembled with the members and a grease was sealed to manufacture test specimens. A table shown in FIG. 16 shows the thickness of the oxide layer, the surface hardness, and the method of secondary heating (re-heating oxidation).

Then, referring to the table shown in FIG. 15, description is to be made for the critical meanings of the ingredient compositions of the alloy for surface-treated rolling bearings according to the present invention, particularly, those applied with carburization or carbo-nitridation.

C: 0.2–0.6% by Weight

C is necessary by 0.2% or more in order to obtain stable cleanness with less inclusions as mass produced materials, regarding inclusions which are considered to be deleterious in view of deterioration of the fracture resistance and lowering of life due to peeling or the like, as well as to shorten the treating time for carburization or carbo-nitridation applied for obtaining necessary hardness for rolling fatigue resistance. On the other hand, if it is contained by more than 0.6%, cracking resistance at a central portion is lowered or the amount of austenite in the inside is increased at high temperature to cause a problem in the dimensional stability, so that the content is defined as from 0.2 to 0.6%.

Si: 0.15–0.50% by Weight

Si is an element for retarding the structural change and improving the hardenability and it is an element also for improving the high temperature strength. Since dioxidizing effect may not sometimes be sufficient if it is less than 0.7%, whereas the workability is remarkably deteriorated if it exceeds 1.5%, the content is defined as from 0.7 to 1.5%.

Cr: 0.30–0.65% by Weight

Cr is an element of improving the hardenability and promoting the sphericalization of carbides and also an element of improving the high temperature strength.

Accordingly, it has to be contained at least by 0.5% or more but, if it is contained by 2.0% or more, carbides grow coarser to make the average crystal grains larger and sometimes deteriorate the cutting property, so that the content is defined as from 0.5 to 2.0%.

Mo: 0.5–2.0% by Weight

Mo is an element for improving the hardness of bearings by anti-temperability or dispersing effect of fine carbides and it is necessary by 0.5% or more. However, if it exceeds 2.0%, the effect is saturated and the workability may rather be degraded possibly, so that the content is defined as from 0.5 to 2.0%.

With respect to O, it is desirably to be 16 ppm or less in order to reduce the formation of oxide series inclusions. Also with respect to S, it is preferably 0.02% or less.

After carburization or carbo-nitridation, it is desirable that the surface C concentration is from 0.8 to 1.2% or the surface N concentration is from 0.05 to 0.5%.

Surface C Concentration: 0.8–1.2% by Weight

The surface C concentration has to be 0.8% or more in order to obtain a sufficient strength relative to required hardness for resistance to rolling contact fatigue. On the other hand, if the surface C concentration exceeds 1.2%, macro-carbides tend to be formed and they tend to form crack initiation points, so that the surface C. concentration is defined as from 0.8 to 1.2%.

Surface N Concentration: 0.05–0.5% by Weight

When the surface N concentration is 0.05% or more, the tempering resistance is increased and the strength is improved by the effect of dispersing and precipitating fine carbonitrides. On the other hand, if it exceeds 0.50%, the abrasion resistance is increased and grinding fabrication tends to become difficult and, resistance to brittle cracking is also lowered, so that the surface N concentration is defined as from 0.05 to 0.50%.

Any of Examples 1 to 9 substantially satisfies the recommended values in the present invention in containing ingredients of: C=0.2–0.6%, Si=0.7–1.5%, Cr=0.5 2.0%, and Mo=0.5–2.0%, and having the surface C concentration of 0.8 to 1.2% or the surface N concentration of 0.05 to 0.5%. Si in Example 1, Cr in Example 2, and Mo in Example 3 are somewhat lower than the recommended value respectively. Further, any of Examples 1 to 9 satisfies the condition of the present invention that the thickness of the oxide layer is 1 to 1000 nm, but the thickness is at 300 nm in Example 1, at the lower limit value in Example 2 and at the upper limit value in Example 3 and they are out of 5 to 100 nm as the recommended value. Further, any of Examples 1 to 9 satisfies the surface hardness of Hv 650 or more as the condition of the present invention but it is Hv 650, 695 and 670, respectively, in Example 1 to 3 which are lower than Hv 700 as the recommended lower limit value.

On the other hand, in Comparative Example 1, C, Si and Mo are out of the recommended values of the present invention, neither carburization nor carbo-nitridation is applied and, further, the surface hardness is also lower than the condition of the present invention. Further, in Comparative Example 2, the primary tempering temperature is lower than the condition of the present invention and, as a result, the amount of residual austenite (γR) is increased as 30%. Further, in Comparative Example 3, the secondary heating is not applied and the oxide layer is not formed. Further, in Comparative Example 4, the secondary heating temperature is higher than the condition of the present invention and, as a result, the thickness of the oxide layer is greater than the condition of the present invention. Further, in Comparative Example 5, C is lower than the recommended value of the present invention and the surface hardness is also lower than the condition of the present invention. Further, in Comparative Example 6, the primary tempering temperature is higher than the recommended value of the present invention and also the surface hardness is lower than the condition of the present invention.

6-2: Testing Apparatus and Method

The test was conducted by using the same tester as in Comparative Test 1 explained previously (FIG. 2) and by the same method.

6-3: Test Results

A table shown in FIG. 17 shows the evaluation time for each test specimen (bearing life) and presence or absence of peeling (fracture) as the test results.

In Examples 1 and 3, while iron/chromium oxide series layers were formed at 300 nm and 1000 nm, respectively, peeling occurred to outer rings in 6 and 4 out of 10 specimens and the $L_{10}$ life was 83 hr and 91 hr, respectively. The rolling life is sufficiently longer compared with that in each of comparative examples to be described later, but somewhat shorter than that in Examples 4 to 9. Since the Si content was as low as 0.4% in Example 1, the hardness after the heat treatment was at Hv 650 which was at the lower limit value as the condition of the present invention but lower than the recommended value (=Hv 700). Further, also in Example 3, since the Mo content and the surface C+N concentration were lower, the surface hardness of the bearing was Hv 670, which was lower than the recommended value of the present invention. While the layer thickness was also sufficient, the rolling contact fatigue life was somewhat deteriorated under a high temperature circumstance of 130° C.

In Example 2, the Cr content was as low as 0.1%, the bearing surface hardness was Hv 695 and the oxide layer thickness was 1 nm. As a result of observation for the bearing raceway surface of the peeled bearing, since the oxide layer of the inner ring remained intact as it was and fracture was observed only to the oxide layer on the outer ring, it is considered that the rolling life depends on the variation of the layer thickness. Further, in the high temperature test at 130° C., since the surface hardness was at Hv 695 and somewhat lower than the recommended value of the present invention, the rolling fatigue life was also somewhat deteriorated, to thereby decrease the $L_{10}$ life to 80 hr.

In Examples 4 to 9, the oxide layer thickness was 5 to 100 nm, which satisfied the recommended value of the present invention, and peeling did not occur even at 100 hr which was longer by about twice of the calculated life. Further, as a result of observation for the bearing raceway surface after the test, the iron/chromium oxide series layer remained on the rolling contact surfaces both in the inner rings and the outer rings and no layer fracture was recognized.

On the other hand, in Comparative Example 1, SUJ2 was applied with tempering at 400° C. and, subsequently, re-heated at 250° C. to form an oxide layer at 20 nm on the surface of the bearing rings. However, since the surface hardness was as low as Hv 540, plastic deformation tended to be caused and early peeling occurred for the outer and inner rings at internal initiation points in 10 out of 10 specimens, which resulted in the shortest $L_{10}$ life of 8 hr.

Further, in Comparative Example 2, although the surface hardness was at Hv 700 and the surface layer thickness was at 17 nm, since the primary tempering temperature as the tempering temperature after carburization and hardening was as low as 160° C. and the amount of residual austenite (γR) was as high as 30 vol %, dimensional change resulted to cause increase of vibrations and scorching under a high temperature condition at 130° C. Accordingly, the $L_{10}$ life was 21 hr, which was about one-half of the calculated life.

Further, in Comparative Example 3, since the bearings were not applied with iron oxide series layer forming treatment, peeling occurred for the outer rings in 10 out of 10 specimens and the $L_{10}$ life was 12 hr, which was ¼ of the calculated life.

Further, in Comparative Example 4, while an oxide layer at 2000 nm was formed on the raceway surface, the raceway surface formed scales entirely and was embrittled to form a lot of pits on the surface. Further, peeling occurred both in the inner and outer rings and, accordingly, peeling occurred at the pit initiation points and the $L_{10}$ life was 30 hr.

Further, in comparative Examples 5 and 6, the oxide layer thickness on the surfaces of bearing rings was sufficient as 22 nm and 100 nm, respectively but, since the surface hardness was as low as HV 630 and HV 605, peeling occurred for the inner and outer rings in 10 out of 10 specimens and the $L_{10}$ life was 30 hr.

As apparent from the foregoing results, it can be said that the range for the thickness of the oxide layer effective to the improvement of the rolling life by the re-heating oxidation according to the present invention is within a range from 1 to 1000 nm and a more preferred range is from 5 to 100 nm.

(7) Comparative Test 7: Life Test Under Lubrication with Sealed Grease Incorporated with Water 7-1: Tested Bearing While lubricants incorporated with 5% water were used as the lubricants in Comparative Test 6, grease-sealed bearings were used in this test in the same manner as in Comparative Test 2, and rolling bearings which were sealed with 3% water-incorporated grease were used as bearings for test specimens. The used grease was also identical in which dialkyl diphenyl ether was used as the base oil, and a diurea type compound was used as the viscosity increasing agent with the amount of the viscosity increasing agent of 15%. For the bearings as the test specimens, bearing inner rings and outer rings identical with those in Examples 1, 2 and 3 and Comparative Examples 2, 3 and 4 were used and usual second class bearing steels were used for the rolling elements, among those used in Comparative Test 6 described above (refer to Table 8).

7-2: Testing Apparatus and Method

In the same manner as in Comparative Test 6 described previously, the tester shown in FIG. 2 was used. However, the lubricant circulating oil feed device was not used. The test conditions were identical with those in Comparative Test 6. For temperature, since abrupt elevation of the test temperature was expected due to heat generation of grease, the bearing temperature was kept at 130° C. while cooling the housing under control by using the cooling device. The number of test specimens, judgment for the completion of the test, the test termination time (evaluation time) and the like were also identical with those in Comparative Test 6.

7-3: Test Results

A table shown in FIG. 18 shows the evaluation time and the situation of peeling (fracture).

As a result, in Examples 1 and 3, while the oxide layer thickness was sufficient as 300 nm and 1000 nm, since the surface hardness was somewhat lower as HV 650 and 670 in the same manner as in Comparative Test 6, peeling also occurred in the outer rings in three out of 10 specimens and the $L_{10}$ life was 90 hr and 98 hr, respectively.

Further, in Example 2, an oxide layer of 1 nm thickness was formed and peeling did not occur even upon reaching 100 hr. Further, as a result of observation for the rolling surface after the test, the oxide layer remained intact and no fracture was observed. This is considered that since the effect of the water content in the grease was smaller in Examples 2 compared with Example 1, the layer was not abraded.

On the other hand, in Comparative Example 2, since this was the grease test, abnormal scorching tended to occur and the bearing showed great dimensional change as the result of Comparative Test 6, and scorching occurred in 10 out of 10 specimens and the $L_{10}$ life was 10 hr, which was as short as about one-half of that in Comparative Test 1.

Further, in Comparative Examples 3, since the oxide layer was not present on the surface of the bearing ring, the $L_{10}$ life by peeling was as short as 15 hr.

Further, in Comparative Example 4, peeling was induced from the pit initiation points to provide the same results as in Comparative Test 6.

From the foregoing results, it can be said that, under the high temperature circumstantial condition and under the condition where water intrudes into the inside of the bearings (lubricant incorporated with water), stress corrosion crack type peeling due to intrusion of hydrogen formed by the decomposition of water contained by several % in the lubricants can be suppressed, by increasing the bearing hardness to HV 650 or more and providing the iron/chromium oxide series layer (re-heating oxide layer forming treatment) to 1 to 1000 nm on the surface of the bearing. In view of the shortening of the heating time and the peeling resistant life, it is considered that the thickness of the iron/chromium oxide series layer is preferably from 5 to 100 nm and the surface hardness is preferably Hv 700 or more.

In the embodiments described above, while carburization or carbo-nitridation was applied to case hardened steels, it is considered that the same effect can also be obtained with induction hardened steels. Further, for the re-heating oxide layer forming treatment in this case, while the heat treatment was conducted only for once after grinding, it is more preferable to repeat the treatment for several times since the oxide layer thickness is increased more.

Further, while the bearing material was heat treated and ground and then dried spontaneously in this case, it is actually desirable that oils and fats deposited after grinding on the metal surface were degreased (for example by solving decreasing or alkali degreasing) and then the material is heated in air to form the iron/chromium oxide series oxide layer. Further, it is also possible to apply the oxide layer forming treatment after assembling the inner rings, the outer rings and the rolling elements as the bearing.

Further, while it has been described to apply the layer forming treatment for the inner and outer rings in the present invention, since the water content tends to accumulate on the fixed ring (corresponding to the outer ring in the present invention) in a circumstance where water intrudes in the bearing, cost can be reduced by the bearing in which the layer is applied at least to the fixed ring.

INDUSTRIAL APPLICABILITY

As has been described above, in the rolling bearing according to the present invention, since an oxide layer comprising an iron/chromium oxide series (re-heating oxidation layer) is formed to a thickness of 1 to 1000 nm at least on the surfaces of the bearing rings or the rolling elements of the rolling bearing, even when it is used, particularly, in a circumstance under such a severe condition that water intrudes into the lubricants, formation of hydrogen by the decomposition of intruding water and intrusion of hydrogen atoms into the matrix of the members can be suppressed by the oxide layer and, as a result, the bearing life can be extended greatly.

In particular, since the lower limit for the thickness of the oxide layer is defined as 5 nm, intrusion of the hydrogen atoms into the matrix of the members can be suppressed more reliably to extend the bearing life.

Further, when the surface hardness of the raceway surface of the bearing ring or the rolling contact surface of the rolling element each formed with the oxide layer is made at Hv 650 or more, occurrence of early peeling in the raceway surface of the bearing rings can be suppressed to extend the bearing life.

Further, dimensional expansion by the decomposition of residual austenite at high temperature can be suppressed by reducing the amount of residual austenite in the bearing rings or the rolling elements each formed with the oxide layer to 6 vol % or less, and as a result, creeping can be prevented. Particularly, when the amount of residual austenite is reduced to 2 vol % or less, a more preferred creep preventing effect can be obtained.

Further, a sufficient hardness for the rolling contact fatigue resistance can be obtained by applying carburization or carbo-nitridation for the bearing rings or the rolling elements each formed with the oxide layer.

In the manufacture of the rolling bearing according to the present invention, since tempering at a high temperature is applied at a temperature from 240 to 320° C. and then the re-heating treatment is applied in air at a temperature lower by 30° C. or more than the tempering temperature, early peeling for the bearing under high temperature and high load can be prevented effectively with no troubles such as those in the case of black coating. Alternatively, by applying re-heating in air at a temperature lower than 400° C. to those applied with carburization or carbo-nitridation and hardening and then applied with tempering at 400° C. or higher, a rolling bearing having high surface hardness and not suffering from early peeling even at high temperature and under high load can be provided.

What is claimed is:

1. A method of manufacturing a rolling bearing in which a plurality of rolling elements are arranged between bearing rings comprising a fixed ring and a rotational ring, wherein the method comprises a step of applying a hardening treatment to at least one member of the bearing rings or the rolling elements and then applying a tempering treatment at a temperature within a range from 240 to 320° C. and a step of re-heating the tempered member in air at a temperature lower by 30° C. or more than said tempering temperature, thereby forming an oxide layer comprising an iron/chromium oxide to a thickness of from 1 to 1000 nm on the surface of the member and making the surface hardness to Hv 650 or higher.

2. A method of manufacturing a rolling bearing in which a plurality of rolling elements are arranged between bearing rings comprising a fixed ring and a rotational ring, wherein the method comprises a step of applying a hardening treatment to at least one member of the bearing rings or the rolling elements and then applying a tempering treatment at a temperature within a range from 400 to 500° C. and a step of re-heating the tempered member in air at a temperature lower than 400° C., thereby forming an oxide layer comprising an iron/chromium oxide to a thickness of from 1 to 1000 nm on the surface of the member and making the surface hardness to Hv 650 or higher.

* * * * *